United States Patent [19]
Cho

[11] Patent Number: 5,959,552
[45] Date of Patent: Sep. 28, 1999

[54] SYSTEM FOR MINIMIZING AUTOMOBILE COLLISION DAMAGE AND PERSONAL INJURY

[76] Inventor: Myungeun Cho, 13404 Tossa La., Austin, Tex. 78729

[*] Notice: This patent is subject to a terminal disclaimer.

[21] Appl. No.: 08/859,647

[22] Filed: May 20, 1997

Related U.S. Application Data

[63] Continuation-in-part of application No. 08/650,869, May 20, 1996, Pat. No. 5,646,613.

[51] Int. Cl.⁶ .................................................. G08G 1/16
[52] U.S. Cl. ........................... 340/903; 340/94; 340/435; 180/167; 180/169; 280/730.2
[58] Field of Search ................................ 340/903, 904, 340/425.5, 435, 436; 180/167, 169, 274; 280/730.1, 730.2, 736, 737, 741; 342/70, 71, 72

[56] References Cited

U.S. PATENT DOCUMENTS

| | | | |
|---|---|---|---|
| 3,614,128 | 10/1971 | Sobkow | 280/741 |
| 4,027,307 | 5/1977 | Litchford | 342/32 |
| 4,858,203 | 8/1989 | Hansen | 367/103 |
| 5,106,137 | 4/1992 | Curtis | 293/107 |
| 5,324,072 | 6/1994 | Olson et al. | 280/730 A |
| 5,482,314 | 1/1996 | Corrado et al. | 280/735 |
| 5,497,327 | 3/1996 | Takaya et al. | 340/436 |
| 5,519,377 | 5/1996 | Murphy | 340/435 |
| 5,530,651 | 6/1996 | Uemura et al. | 340/435 |
| 5,565,870 | 10/1996 | Fukuhara et al. | 342/70 |
| 5,582,428 | 12/1996 | Buchanan et al. | 280/741 |
| 5,590,904 | 1/1997 | Ellis et al. | 280/735 |
| 5,620,202 | 4/1997 | Gray et al. | 340/436 |
| 5,626,359 | 5/1997 | Stefferns, Jr. et al. | 280/735 |
| 5,684,473 | 11/1997 | Hibino et al. | 340/903 |

*Primary Examiner*—Daniel J. Wu
*Assistant Examiner*—Van T. Trien
*Attorney, Agent, or Firm*—Richard C. Litman

[57] ABSTRACT

A system for minimizing roadway vehicle damage and personal injury which includes a detection sensor unit, a computer processing unit (CPU), and energy absorbing inflation devices. The detection sensor unit, which is mounted on the roadway vehicle to detect the speed, distance and direction of a potential obstacle, includes a transmitter for transmitting signals and a directional receiver to receive signals reflected by the potential obstacle and generates an electronic signal in response thereto. The CPU, which receives information on the speed and direction of the roadway vehicle and receives signals from the detection sensor unit continuously processes the information and signals and calculates changes in the speed, distance and direction of the potential obstacle with respect to the roadway vehicle. The CPU generates a control signal upon calculation of an imminent collision situation, which calculation is based on a predetermined minimum allowable time window. The minimum allowable time window is generally defined as a time period during which a driver of the roadway vehicle is unable to take evasive action, such as braking or turning the steering wheel, to avoid a collision situation. Each of the energy absorbing inflation devices includes an electronically controlled valve, with at least one of the energy absorbing inflation devices being responsive to the control signal. An external air bag is coupled to the valve of one of the energy absorbing inflation devices and an internal air bag is coupled to the valve of another of the inflation devices, such that upon calculation by the CPU of the imminent collision situation based on the predetermined minimum allowable time window, the CPU transmits the control signal to one of the energy absorbing inflation devices to deploy the air bags prior to the time of actual collision.

3 Claims, 19 Drawing Sheets

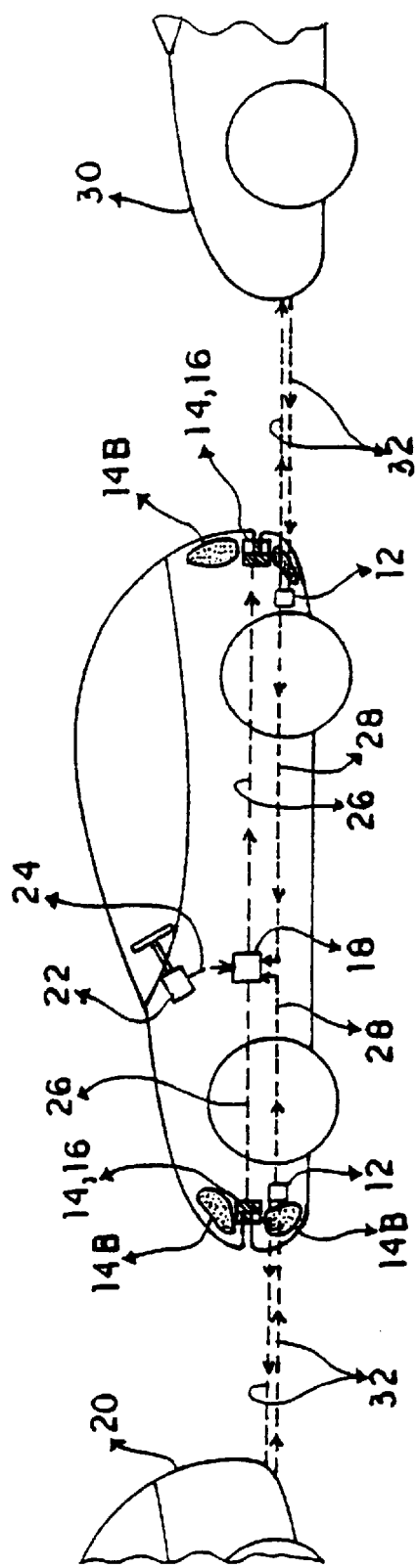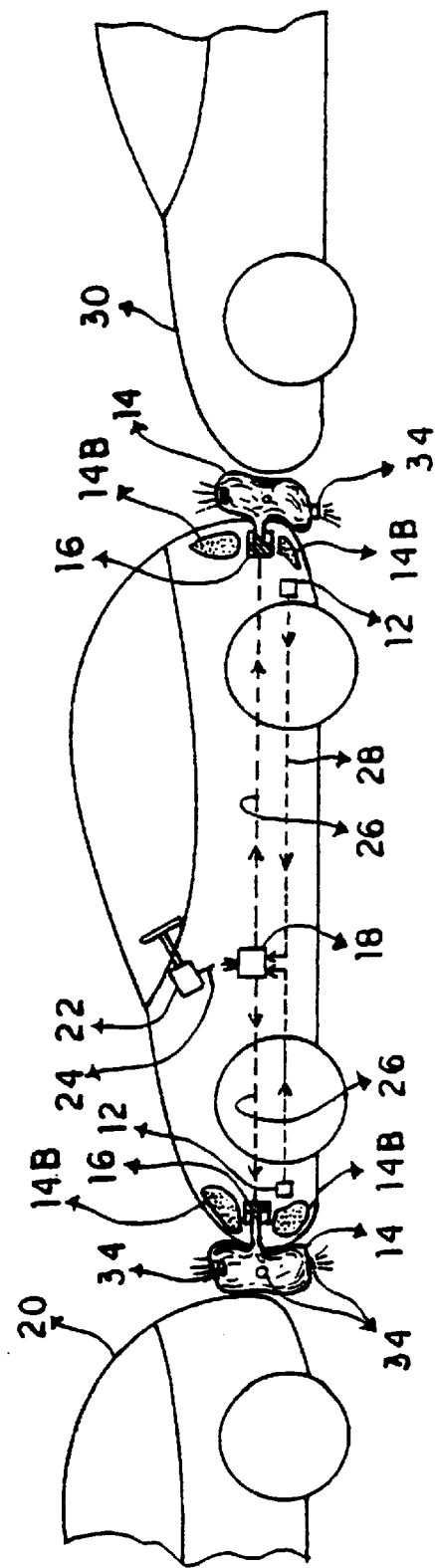

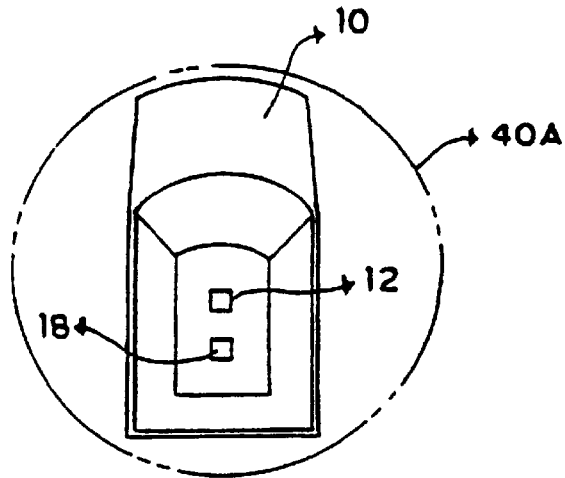
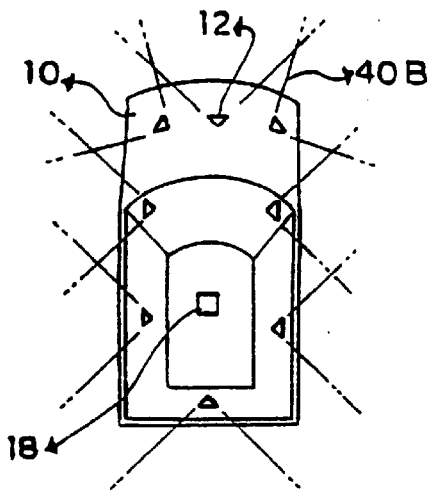
FIG 7  FIG 8
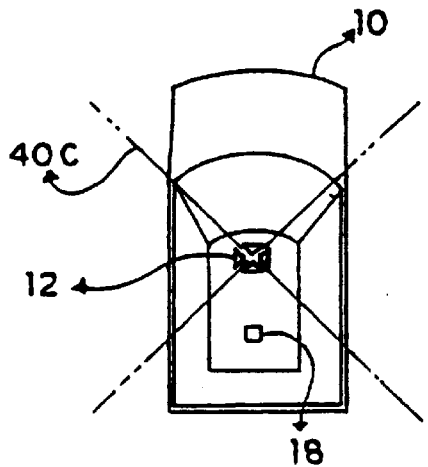
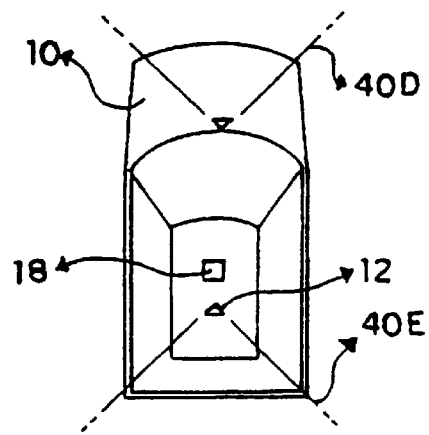
FIG 9  FIG 10
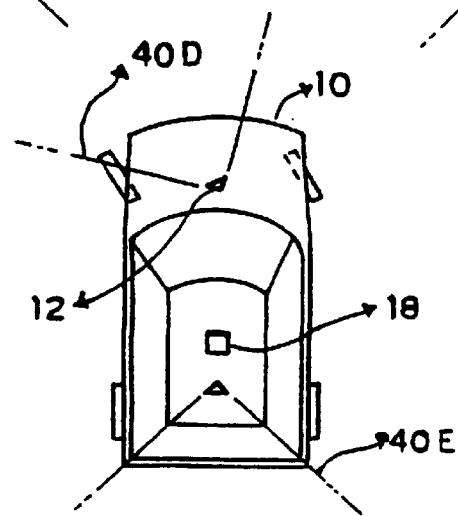
FIG 11

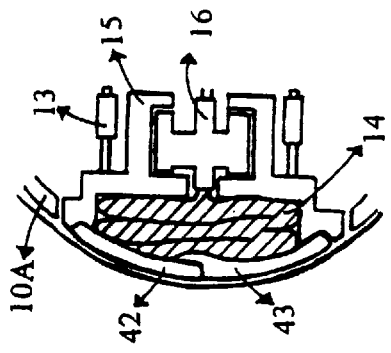
FIG 13
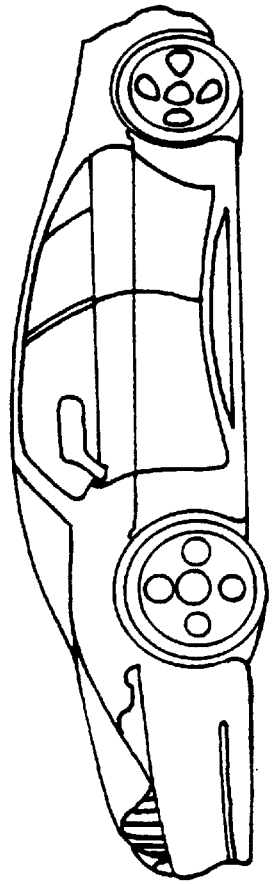
FIG 12
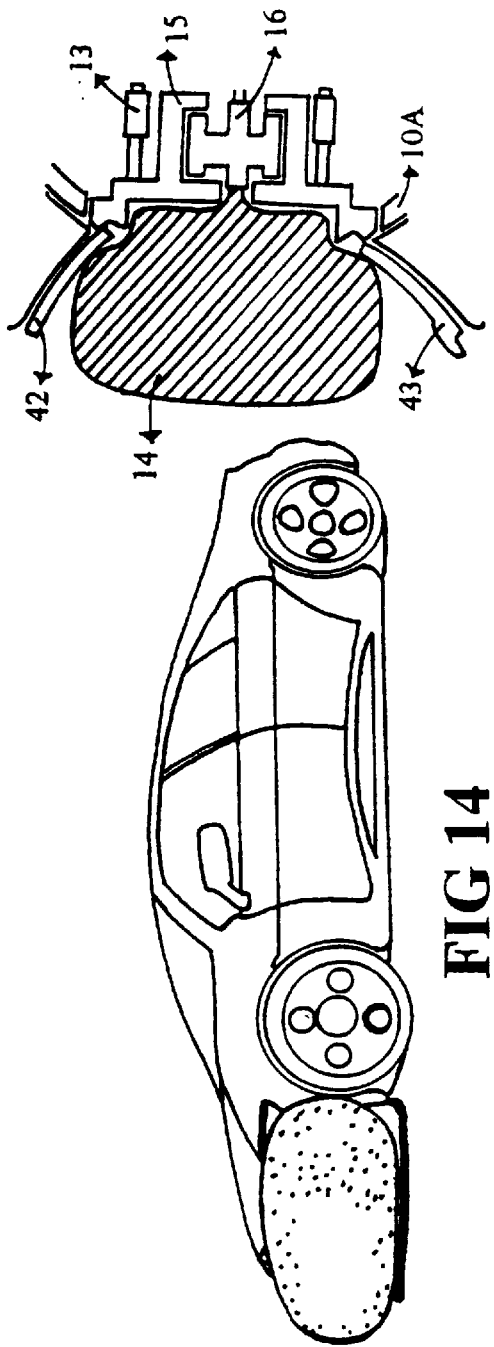
FIG 15
FIG 14

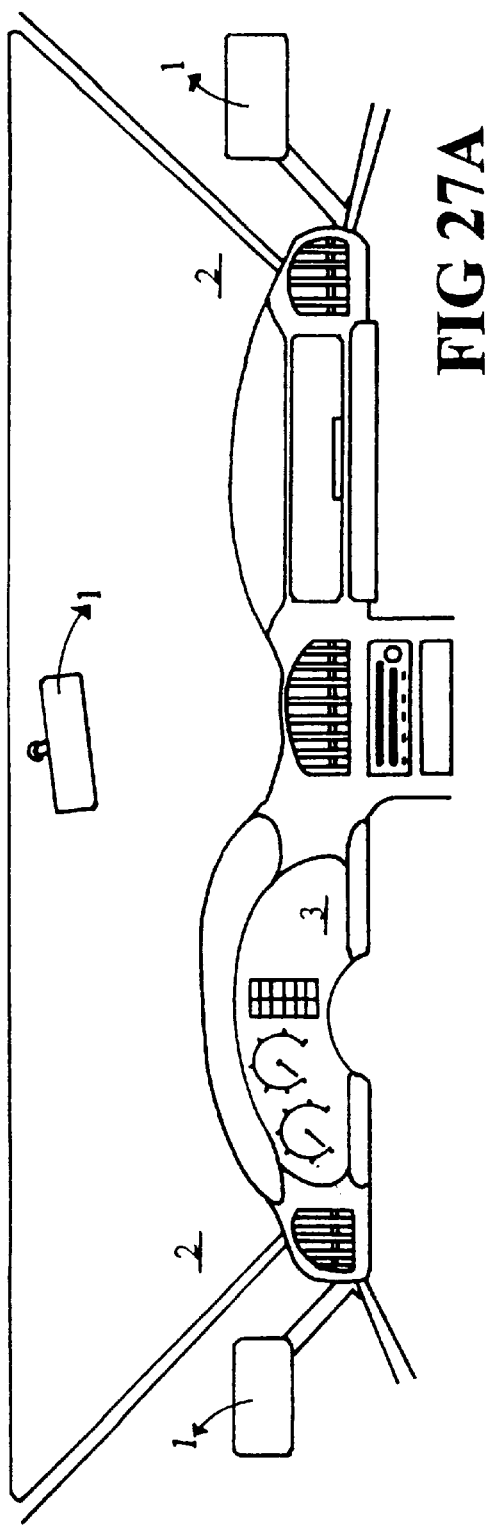
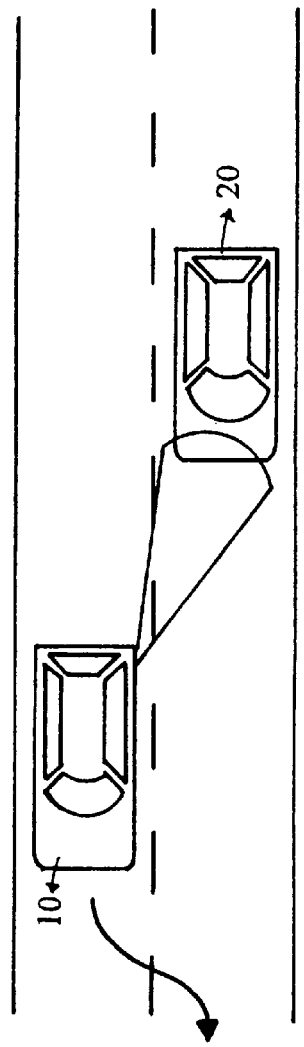

SYSTEM FOR MINIMIZING AUTOMOBILE COLLISION DAMAGE AND PERSONAL INJURY

This application is a continuation in part of U.S. Ser. No. 08/650,869 filed May 20, 1996 now U.S. Pat. No. 5,646,613.

BACKGROUND OF THE INVENTION

1. Field of the Invention

This invention relates to a system for minimizing damage to automobiles involved in accidents or collisions and for restricting personal injury in accidents or collisions. In one aspect, the invention relates to a computer processor based system for predicting a collision and deploying airbags for protection of the occupants and the roadway vehicle just prior to the impact. More particularly, the present invention relates to a system for monitoring the speed and direction of the roadway vehicle, the speed, direction and distance of other obstacles in relationship to the roadway vehicle, for affording intelligent cruise control, warning to the operator, and for deploying of air bags prior to the collision to restrict the movement of the occupants and to absorb the impact of the obstacle colliding with the roadway vehicle. Another aspect is the monitoring of vehicles adjacent to the roadway vehicle to advise the driver of the roadway vehicle when it is safe to change lanes.

2. Description of the Prior Art

Various airbags have been adopted to protect the passengers of a vehicle from injuries resulting from collisions. These air bags have been the steering wheel airbag to protect the driver and the passenger side air bag to protect the passenger. However, these air bags have been found to be the cause for some serious injuries and death to children and short adults. Further there have not been proposals to reduce the cost of repair or replacement of an automobile involved in a collision. Numerous attempts in the art from bumper construction to air bags, to vehicular control and warning systems have come about to protect the occupants of the vehicle. Despite this regard for reducing human danger, in most collisions the damage to the vehicle is unmitigated, creating substantial costs for repair or replacement. Also, the present air bags that deploy upon impact of the roadway vehicle with an obstacle have been found to be the contributing factor in injury and death during accident.

A plethora of patents exemplify various automotive devices known for human protection. Early designs to protect the automobile include: Collision Avoidance System published in the Fortune magazine dated Dec. 11, 1995 currently developed by TRW, describing that a computer based system that adjusts the throttle and the brake to automatically maintain a safe following distance. British Patent Specification No. 550,194 describes a bumper for motor vehicles having a concave cross section and an outer cover within which is located an elastic member having a valve to inflate the pneumatic bumper to provide a protective air cushion throughout the entire surface of the bumper. German patent No. 2,020,360 issued Nov. 11, 1971 discloses a vehicle with bladders that are inflatable at will by the driver of the vehicle by electrical, hydraulic, pneumatic or mechanical means, or there are automatic means provided which initiate inflation of the bladders themselves. For example, sensors can be provided which, e.g., address the distance of the vehicle from a hazard under reverse extrapolation from the approach speed towards this hazard. There may also be provided sensors which address a predetermined deceleration of the vehicle air bags surrounding the vehicle to protect the vehicle, which air bags are inflated when the vehicle is approaching an object and the distance to the object is diminishing and a collision is likely. U.S. Pat. No. 4,215,878, issued Aug. 5, 1980 to Hirbod, discloses an internal air bag deployment system for protecting automobile occupants from injury during an accident. U.S. Pat. No. 4,528,563, issued Jul. 9, 1985 to Takeuchi, discloses an obstruction sensing system to provide an alarm when an obstruction is within a warning area. U.S. Pat. No. 4,694,295, issued Sep. 15, 1987 to Miller et al., discloses a system for warning a driver if another vehicle is located in the blind spot of the mirrors and delivers a warning or provides the actual distance in feet between the vehicle and operators vehicle. U.S. Pat. No. 5,119,901, issued Jun. 9, 1992 to Buie, discloses a vehicle air bag system having switches for triggering the air bags when the bumper is moved and a distance measuring system for generating an alarm signal when a radar ranging device detects tile distance between the vehicle and other vehicles to be in a potentially dangerous condition. U.S. Pat. No. 5,347,273, issued Sep. 13, 1994 to Katiraie, discloses an ultrasonic detection system for sensing an obstacle and measuring the distance to that obstacle and generating an alarm or activating an air bag when the vehicle is within a dangerous distance to another vehicle. U.S. Pat. No. 5,106,137, issued Apr. 21, 1992 to Curtis, discloses an improved vehicle bumper having, internally of the bumper shell, an air bag for providing additional energy absorption upon impact. U.S. Pat. No. 5,165,497, issued Nov. 24, 1992 to Chi, discloses a system for controlling driving distances. U.S. Pat. No. 5,166,881, issued Nov. 24, 1992 to Akasu, discloses a control apparatus for maintaining a set distance between a vehicle and a leading vehicle. U.S. Pat. No. 5,202,742, issued Apr. 13, 1993 to Frank et al., discloses a vehicle guidance system utilizing laser radar. U.S. Pat. No. 5,209,519, issued May 11, 1993 to Shiga et al., discloses an air bag for protecting the occupants of a vehicle upon impact. U.S. Pat. No. 5,314,037, issued May 24, 1994 to Shaw et al., discloses an automobile collision avoidance system that uses a laser radar and microprocessor for anticipating a collision and warning the driver of the possibility of the accident. Additionally, this patent discloses the control of vehicular functions such as braking. U.S. Pat. No. 5,324,072, issued Jun. 28, 1994 to Olson et al., discloses an air bag for protecting the occupant of an automobile from broadside injury by deploying the air bag from the internal side of the automobile. U.S. Pat. No. 5,332,057, issued Jul. 26, 1994 to Butsuen et al., discloses an automatic vehicular control system for altering the direction and/or speed, ultimately avoiding contact. U.S. Pat. No. 5,357,438, issued Oct. 18, 1994 to Davidian, discloses an anti-collision system for automobiles using a multiplicity of sensors and a computer processor for predicting an accident, and subsequently warming the vehicle operator of the possible danger. U.S. Pat. No. 5,400,864, issued Mar. 28, 1995 to Winner et al., discloses a system and method for controlling vehicle speed by maintaining a set safe distance from a preceding vehicle. U.S. Pat. No. 5,461,357, issued Oct. 24, 1995 to Yoshioka et al., discloses an obstacle detection device for a vehicle, which upon obstacle detection, subsequently controls vehicular functions and emits an alarm warning the operator of the imminent danger. Canadian patent doc. No. 923,604, published Mar. 27, 1973 by Lalone et al., discloses a vehicle anti-collision automatic control system for predicting a collision between two vehicles and causing the vehicle to be slowed or stopped, avoiding a collision. Despite the abundance of such devices, none of the above inventions and patents, taken either singly or in combination, is seen to describe the instant invention as claimed.

SUMMARY OF THE INVENTION

Over the years since the inception of the automobile, many features have been added to enhance its functionality and appearance. For passenger safety, these enhancements range from front seat lap belts to real seat full shoulder harnesses, and from reinforced frame beams to internal air bags. These enhancements have been instituted while maintaining an appealing aesthetic character to the automobile. For example, body side moldings and matching bumpers protect the vehicle and occupants while providing an attractive appearance to the onlooker. For this reason, maintaining the attractiveness is important. The importance resides in the fact that most of the value of a vehicle is not found in its performance, but rather in its appearance. Unfortunately, all of the safety features that have been incorporated in today's modern vehicles do not always restrict the occupants against injury and do not protect the physical appearance of those parts of the vehicle exposed during a collision. These parts, apart from the volatile parts of the vehicle (namely, the engine, gas tank, etc.) need some protection to avoid costly repair and replacement of the assets governing the value of the vehicle in the event of a collision with another obstacle.

The present invention relates to a roadway vehicle equipped with a computer based system for predicting a collision and deploying air bags at an appropriate time for reducing the amount of damage sustained by the roadway vehicle in an accident and for restricting the amount of injury to occupants. The system includes basically, a detection sensor unit for detecting speed, distance, and direction of other obstacles; a speed detector for detecting speed of the roadway vehicle by speedometer; a direction detector for detecting direction of the roadway vehicle; an energy absorbing inflation unit and a central computer processing unit (CPU).

Accordingly, the invention provides an automobile, roadway vehicle, with a system for reducing the amount of physical damage resulting from collision and for restricting injuries or death to occupants resulting from the deployment of driver and passenger air bags upon impact. It is another object of the invention to provide a system that automatically determines the possibility of an accident and initiates damage reducing actions.

It is a further object of the invention to provide a system that automatically deploys air bags externally of the vehicle in the event of an accident, thereby preventing major damage to the vehicle.

Still another object of the invention to provide a system that automatically deploys air bags or keeps the air bags always deployed, internally of the vehicle bumper in addition to the externally deployed air bags of the vehicle in the event of an accident, thereby preventing major damage to the vehicle.

Further, the invention provides a system that automatically deploys airbags internally of the vehicle prior to an imminent collision to restrict injury or prevent death of the occupants.

Further, due to the cost of repair and replacement of air bags, when the roadway vehicle is within an unavoidable collision distance (equal with the minimal allowable time window), it is another aspect of this invention to have switches to disable the inflation units for the internal air bags when the safety belt is not fastened. Also, another aspect of this invention is to have the relative speed between the two vehicles control inflation of the air bags, e.g.: (1) lower than 5 mph, no air bags inflate, (2) higher than 5 mph, external air bag only inflate, (3) higher than 20 mph, external and internal air bags inflate.

Further, the present invention provides a system that maintains the original aesthetic quality of a vehicle in the event of a collision.

Further, the present invention provides a system of intelligent cruise control, a system for advising the driver of the roadway vehicle when it is safe to change lanes, a warning system for warning the driver of the roadway vehicle when the roadway vehicle is backing up and when any obstacle is existing in the dead angle and a system to deploy air bags to hold occupants in their seats and to deploy air bags external to the vehicle perimeter to cushion and protect the aesthetic appearance of the roadway vehicle in the event of an actual collision.

Still further, the present invention provides a system to monitor the location of the roadway vehicle in relationship to other vehicles and obstacles by utilizing the Global Positioning System (GPS) as the detection sensor unit to detect the relationship the roadway vehicle, its speed and direction, in relationship to the speed, direction and distance from obstacles, including vehicles, to control the onboard energy absorbing inflation devices, intelligent cruise control system, and warning system, for restricting damage to the roadway vehicle and for restricting injury or death occupants.

These and other features and objects of the present invention will become readily apparent upon future review of the following specification and drawings.

BRIEF DESCRIPTION OF THE DRAWINGS

The present invention will be described with reference to the accompanying drawing wherein:

FIGS. 3 and 4 are environmental side views of the system of the present invention in states before and after a collision;

FIGS. 7, 8, 9, 10 and 11 are top environmental views of alternative radar arrangements of the present invention;

FIG. 12 is a perspective view of a roadway vehicle equipped with the present invention;

FIG. 13 is a cross-sectional view of the front bumper of the vehicle of FIG. 12 illustrating the closed lids of the bumper housing the folded air bag and inflation unit, FIG. 14 is a perspective view of the roadway vehicle of FIG. 12 with the air bag in the bumper deployed;

FIG. 15 is a cross-sectional view of the front bumper of the vehicle of FIG. 14;

FIGS. 27 and 28 illustrate diagrammatically the use of the squeezing-in feature of the present system to aid the merging of the roadway vehicle (10) with vehicles (20) in another lane of traffic; and FIG. 27A illustrated the indication of the squeeze in status;

FIGS. 32-1 and 32-2 include diagrammatic views of functions of the detection sensor unit and the computer and compares the present invention with conventional devices regarding determination of imminent situation based on speed, distance and direction.

Similar reference characters denote corresponding features consistently throughout the attached drawings.

DETAILED DESCRIPTION OF THE PREFERRED EMBODIMENTS

Figure 1:
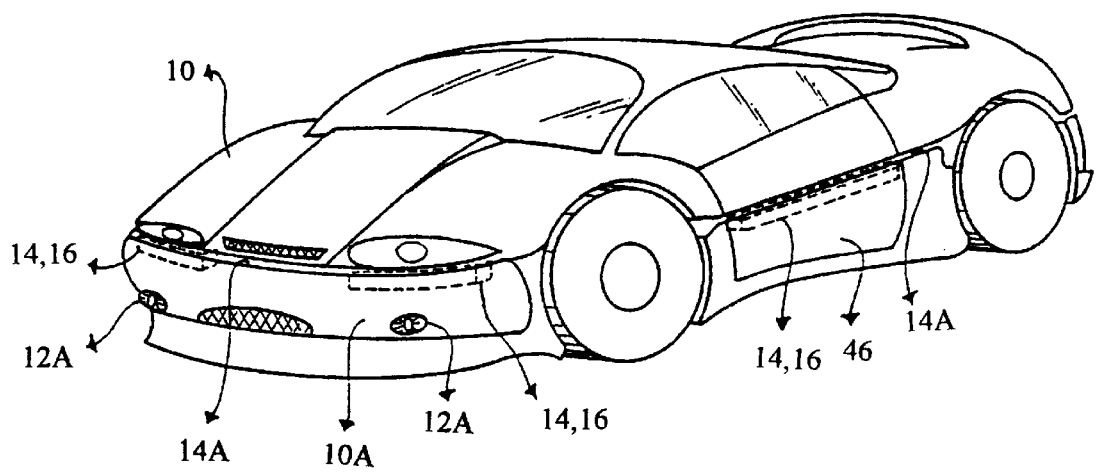
FIGS. 1 and 2 are perspective views of all automobile equipped with the system of the present invention showing comparison views of external air bags before and after inflation.

In the preferred embodiment, a roadway vehicle is equipped with a computer based system for predicting a collision and deploying air bags at an appropriate time for reducing the amount of damage sustained by the vehicle in the accident and reducing the risk of bodily injury or death to the occupants. The system includes basically, a detection sensor unit, speed detector, direction detector, at least one energy absorbing inflation unit and a central computer processing unit (CPU).

The detection sensor unit can be of any known type that is radiant energy detector including infrared, radar, laser radar, laser, and microwave, that is sonic detector including ultrasonic and acoustic detection devices, wherein laser radar is optionally used because of the more narrow beam width and angular resolution, as the laser radar importantly gives more specific and precise information of detected vehicle's or obstacle's direction, distance, size and relative speed. One such system may include a radar detection device transmitting and receiving signals at a rate in the range of 1 to 1,000,000,000 samples per second. The data obtained by detection sensor unit (hereinafter, radar) is processed by a computer to determine the time of an imminent collision.

The speed detector of the preferred embodiment provides information to the CPU concerning the speed and other vital information concerning the roadway vehicle. This information gives the CPU the instantaneous parameters of the operation of the vehicle allowing the CPU to predict the time an impact will occur.

The energy absorbing inflation unit, typically an air bag unit, responds to a control signal generated by the CPU. The unit has a volume of inflation gas contained in an inflation device (hereinafter inflator). The inflator has an electronically controlled valve that is activated by the CPU, releasing the inflation gas into the air bag. The air bag forms an energy absorbing barrier between the roadway vehicle and the object of the collision to reduce impact. The air bag uses high pressure release valves to divert and dissipate the absorbed energy into the atmosphere. The internal energy absorbing unit is also an air bag, of the type that is standard in the industry, but differs from that of the present invention in that the sensor to release the inflation gas into the air bag is activated by the CPU.

A preferred embodiment of the present invention utilizes a plurality of energy absorbing inflation units externally and internally of the roadway vehicle.

A CPU capable of receiving, and processing input information, and ultimately generating an output signal initiating action is used. Such CPUs are conventional in the art. The CPU of the present invention, through simple known algorithms, with speed, distance, and directional data, can predict when an accident or collision is imminent. The CPU of the present invention, once the prediction has been made, further assesses the time necessary to maximize the protective effect of inflation and generates a control signal to the inflation unit. The time deemed necessary is generally referred to as a minimum allowable time window.

Another aspect of the present invention is that the CPU calculates anticipated collision point on the basis of speed, distance, direction and predetermined minimum allowable time window. The minimum allowable time window of the present invention is to be used for inflating air bags only when it is an unavoidable collision situation and represents the time period up to a collision during which it is impossible for a driver to take action to evade a collision. Note that the purpose of the minimum allowable time window used in Shaw's invention (U.S. Pat. No. 5,314,037 issued May 24, 1994) is to evade a collision and represents the time period prior to a collision during which it is possible for the driver to take action to evade a collision.

Figure 32A:
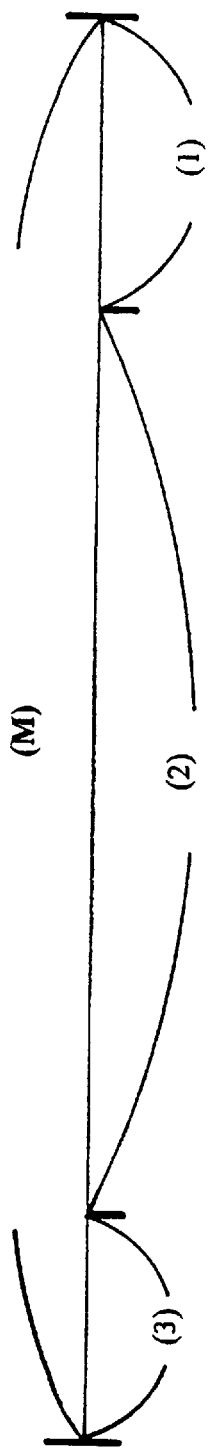
FIG. 32A illustrates the minimum allowable time window (M)).
Figure 32:
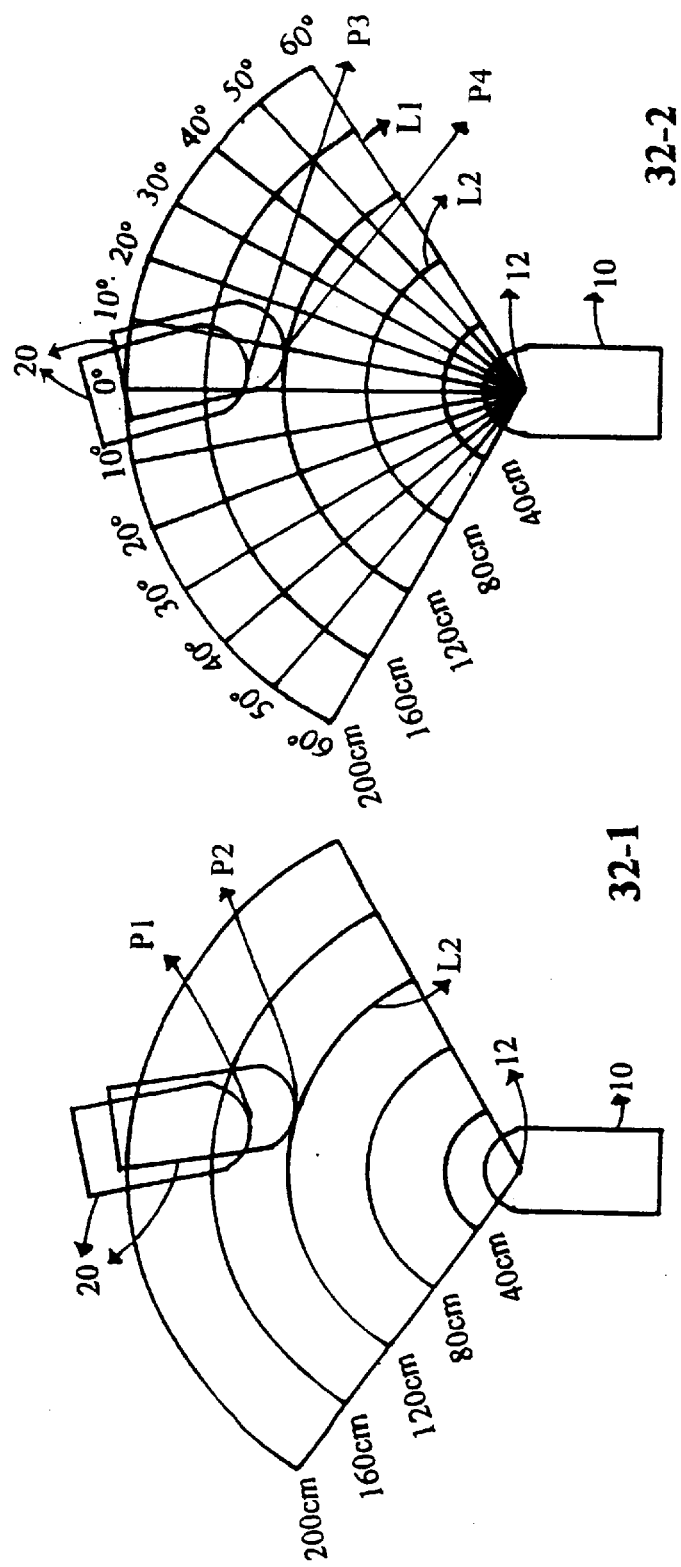

A CPU of the conventional devices as in 32-1 of FIG. 32, is capable of receiving information on speed and distance from the roadway vehicle (10) to point 21, then to point 22 which is 120 cm distance from roadway vehicle 10 and processing input information and ultimately generating an output signal initiating action to anticipate two different situations; (1) colliding case and (2) collision avoiding case.

However the CPU of the present invention as in 32-2 of FIG. 32, through simple known algorithms, given the necessary speed, distance of obstacle (20) moving from point 23 to point 24, 120 cm from roadway vehicle (10), and an assumed parabola made by extending the path of vehicle (20) from point 23 (145 cm×4 degree oil right) to point 24 (120 cm ×10 degree on right), can predict a collision point on the basis of the predetermined minimum allowable time window (e.g. 0.2 second), only predicts whether a collision is imminent or not. By doing so, if the assumed parabola meets the roadway vehicle (10), a collision definitely arises at the point meeting with the roadway vehicle (10), and so the CPU orders the air bag to inflate before impact.

Once a collision becomes imminent, unavoidable and inescapable, the CPU determines the time of impact according to the minimum allowable time window and sends a control signal to the inflation unit. The control signal causes the air bag or bags to inflate during the minimum allowable time and the inflated air bag absorbs the energies associated with the impact power. These energies generally include kinetic, momentum and inertial energies among others. The inflation of the external air bags will reduce the impact power of driving machineries into the compartment of driver and passenger. Thus, upon impact, the occupants are carried forward against an inflated internal air bag instead of against an inflating internal air bag which because of the speed of inflation can exert a devastating blow against an accelerating person, object or an infant seat, e.g. moving in the direction of the inflating air bag.

Figure 2:
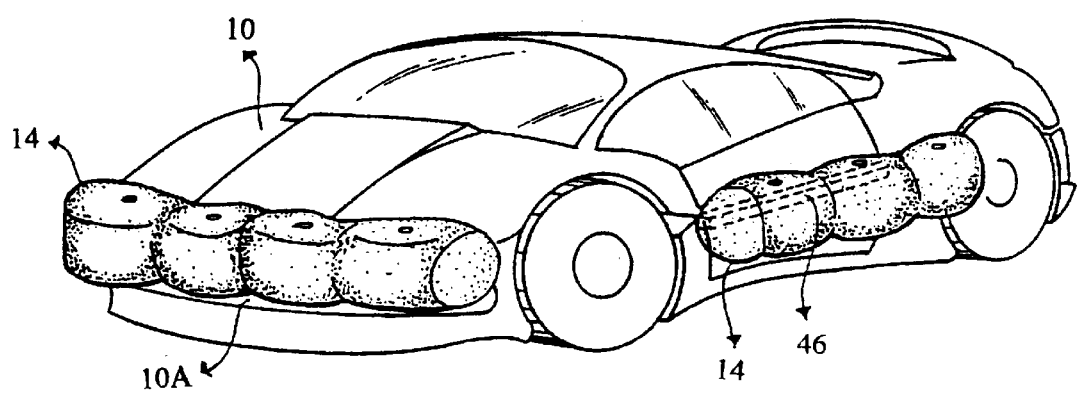

Referring to FIGS. 1 and 2 a roadway vehicle 10 is equipped with the system of the present invention described herein. The system does not interfere with the current level of aesthetic qualities associated with the modern vehicle of today. The exterior of the vehicle 10 has bumpers 10A supporting radar ports 12A and air bag ports 14A. When activated, air bag 14 is inflated through the air bag port 14A, forming an impact buffer between the vehicle 10 and the object of the collision. Mounted in the door panels 46 of vehicle 10 are air bag ports 44A preventing damage to the side of vehicle 10 in a manner similar to that previously described. Greater detail of the system is discussed below and shown in FIGS. 3 and 4, 7 through 11 and 20.

Figure 6A:
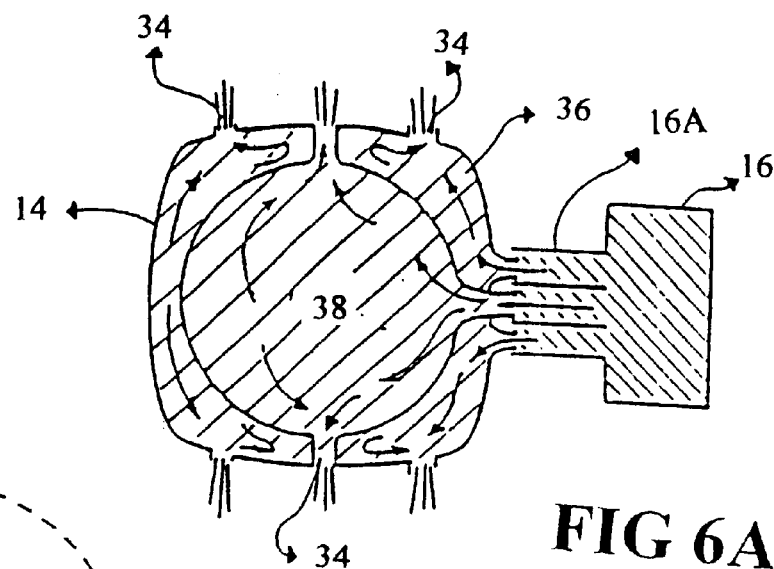
FIGS. 6, 6A and 6B are diagrammatic representations of alternative embodiments of external air bag constructions utilized in accordance with the present invention, with FIG. 6 showing deployed air bags from ports in the vehicle.
Figure 5:
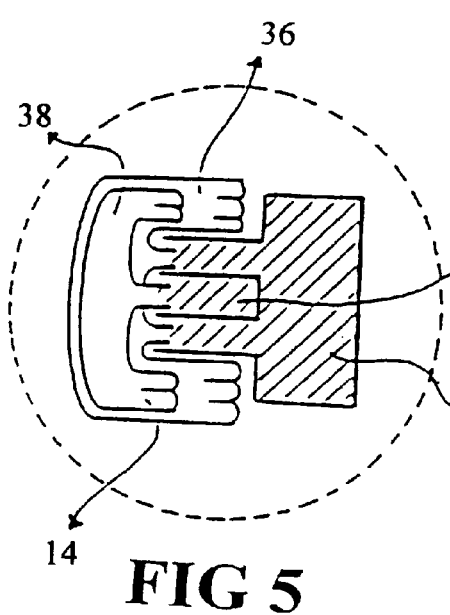
FIG. 5 is an enlarged diagrammatic view of a representative air bag as stored in the automobile shown in FIG. 1.
Figure 6B:
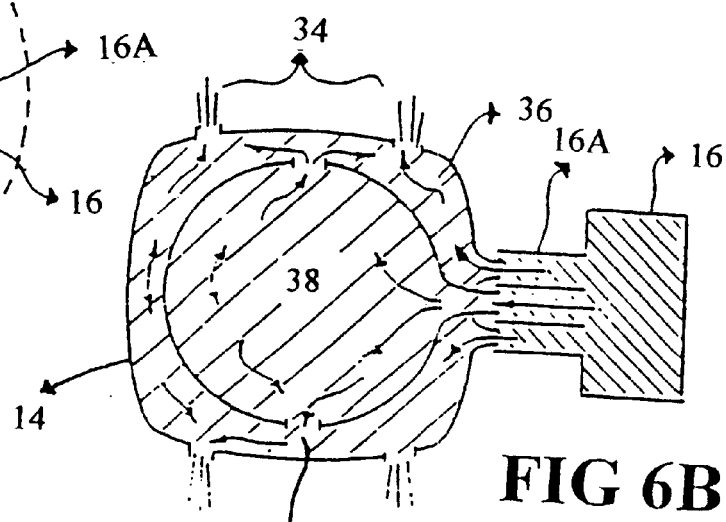
Figure 6:
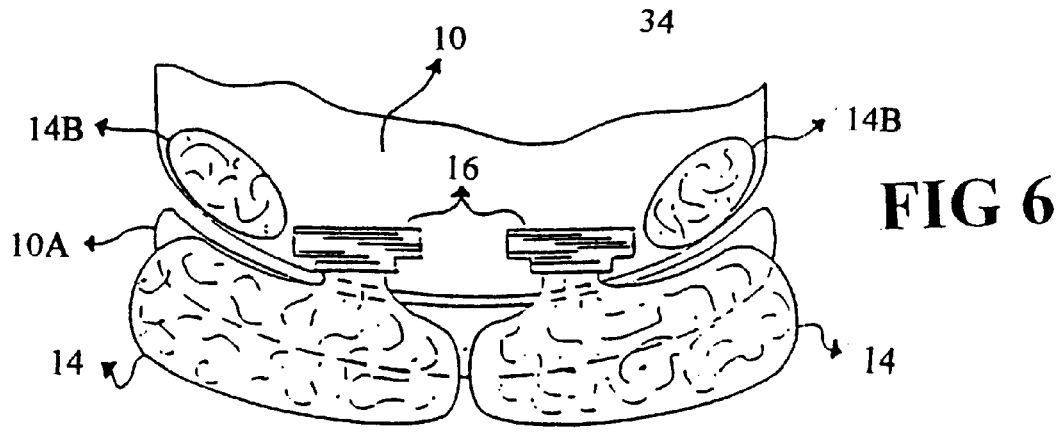

In FIG. 3 the roadway vehicle 10 is in typical traffic road flow. Vehicle 10 is preceded by leading vehicle 20, and succeeded by trailing vehicle 30. The convoy depicted is commonly seen on any roadway, and the speed of each vehicle should be at the appropriate speed limit. Unfortunately, conditions arise to cause disruption in the uniform flow of traffic. For example, while traveling at a high speed leading vehicle 20 approaches an unexpected road hazard, such as a major pothole. Leading vehicle 20 attempts to slow down or stop. Unfortunately, the vehicles 10 and 30 fail to anticipate the danger ahead of leading vehicle 20. Vehicle 10, being equipped with the system of the present invention, has a CPU 18 that constantly monitors the traveling parameters of the vehicle 10 from the dashboard 22 via dashboard link 24. The dashboard 22 including speed detector and direction detector provides information of the speed and direction of the vehicle 10. Speed information may be provided by a speedometer, for example, and directional information may be obtainable from a radar unit mounted at various locations in vehicle 10. The CPU 18 also receives input signals from radar 12 via data lines 28. The radar 12 transmits and receives information concerning the leading 20 and trailing 30 vehicles via the transmitted and reflected signals 32. The signals 32 are sampled by the CPU 18 at a high rate in order to ensure the minimum allowable time (collision unavoidable time) window is satisfactorily set. The signals 32 provide the CPU 18 with information relating to the relative distance between vehicle 10 and both leading 20 and trailing 30 vehicles. Also, signals 32 provide the CPU 18 with information relating to the speeds and moving directions of vehicles 20 and 30. With this information the CPU 18 calculates the changes in distance, speed and direction of vehicles 20 and 30 with relationship to vehicle 10. The CPU 18 is programmed to acknowledge abrupt changes as to potential indications of an impending collision. As leading vehicle 20 suddenly changes speed by braking, radar 12 aboard vehicle 10 detects the change and submits the information to CPU 18. Likewise, as vehicle 10 begins to brake in response to the braking of vehicle 20, radar 12 detects a relative increase in speed from trailing vehicle 30. CPU 18 alerts the operator of vehicle 10 that a collision may occur involving either or both leading vehicle 20 and trailing vehicle 30. CPU 18 also calculates a collision unavoidable distance, determines the apparent time of imminent collision on the basis of the established minimum allowable time window, and generates a control signal. When the collision becomes imminent, unavoidable and inescapable, the control signal is sent from CPU 18 to inflation unit 16 via control lines 26. The inflation gas fills air bags 14 and the air bags 14 are deployed externally of the bumper, after which the inevitable collision occurs as in FIG. 4. By the impact pressure the gas is released from the air bags through valves. In addition, supported internally of the bumpers 10A are several auxiliary air bags 14B. Auxiliary air bags 14B provide impact absorption to the vehicle 10 and bumpers 10A. The auxiliary air bags 14B remain inflated at all times, giving the bumpers 10A an internal buffer for low speed impacts (e.g., 5 mph collision) at which the CPU would not send the control signal to the air bags 14. The air bags 14 provide an energy absorbing buffer between the colliding vehicles 20, 10 and 30. As illustrated in FIG. 5, all inflation unit assembly, including inflation unit 16 and air bag 14, is stored in the vehicle. Inflation unit 16 contains a volume of compressed gas or chemicals. The air bag 14 is shown in a deflated and folded position adjacent to the inflation unit 16. The air bags 14 are illustrated in inflated condition at the front of the vehicle 10 in FIG. 6. As illustrated in FIGS. 6A and 6B, to help absorb the collision energies, air bags 14 convert the absorbed energies into air or gas movement, and the air or gas is released through high pressure release ports 34 to discharge the energy into the atmosphere. Thus, air bag 14 helps maintain the aesthetic quality of the bumper shape of the vehicle 10. Air bag 14 is shown as having multiple compartments, for example other compartment 36 and inner compartment 38, which compartments' operation is more clearly shown in FIGS. 6A and 6B as briefly mentioned above. As seen in FIG. 6A, the outer compartment 36 surrounds inner compartment 38. Each of the outer 36 and inner 38 compartments has a plurality of the high pressure release polls 34 for diverting the impact power to the atmosphere. Alternatively, as seen in FIG. 6B, the inner compartment 38 is completely enclosed internally of the outer compartment 36. The inner compartment 38 has a plurality of high pressure release ports 34 that release the gas into the outer compartment 36. The outer compartment 36 also has a plurality of high pressure release ports 34 that release the gas into the atmosphere. The construction of the high pressure release ports may be accomplished using any of numerous conventional means known in the art, for example, the ports 34 seen in the FIGS. 6A and 6B. Likewise, the ports 34 may include a pneumatic type valve, such that upon impact a valve stem extends from each port through which the internal pressure at impact is forced. It is also conceived that simple a stopper type pop out in each port may be provided. However, the stopper should be permanently tethered to the air bag 14 as a projectile safeguard.

FIGS. 7–11 illustrate various arrangements for location of the radar units 12 on vehicle 10. FIG. 7 shows a vehicle having an omni-directional radar unit emitting a 360 degree radial beam 40A and receiving its corresponding reflected beam. The radial beam 40A may be emitted in many known ways, such as by rotating radar 12. FIG. 8 illustrates a plurality of radars 12 surrounding the perimeter of the vehicle 10, each radar having an inspection region shown by beams 40B (which may overlap increasing continuous perimeter coverage). FIG. 9 illustrates an arrangement of four radars 12 inspecting quadrant regions by beams 40C. FIGS. 10 and 11 illustrate the forward and rearward detection arrangement of the preferred embodiment, radar 12 located in the front of the vehicle 10 is coupled with the steering mechanism of vehicle 10 so that as the steering wheel turns, the radar unit 12 is correspondingly turned to maintain its beam in a direction generally parallel with the direction of the front wheel of the roadway vehicle. This results in the forward beam 40D inspecting the vicinity of the turn into which the vehicle 10 embarks. Beam 40E maintains a rearward inspection, monitoring abrupt changes in distances of vehicles approaching vehicle 10.

FIGS. 12 and 13 illustrate an alternative where the air bags are folded behind ports, lids or doors in the vehicle body which open when an air bag 14 is deployed. As illustrated in FIG. 13, the air bag 14 is folded behind the doors 42 and 43 in the vehicle bumper 10A, inflation unit 16 is protected from impact by steel frame 15 and also protected from impact by buffer 13 which is connected to internal body frame together with steel frame 15 when air bag inflation is not required due to lower speed impact. The doors 42 and 43 are shown as moving upward and downward respectively, as in FIG. 15 to allow the air bag 14 to fully inflate as best shown in FIG. 14. The air bag 14 is deployed by the inflation unit 16.

A roadway vehicle equipped with the computer based system and the CPU for predicting a collision, may also protect the occupants of the roadway vehicle by deploying internal air bags at an appropriate time prior to the impact to restrict, or substantially reduce the risk of bodily injury or death to the occupants. The interior system includes basically the radar 12, dashboard (the speed detector and direction detector) 22 in FIGS. 3 & 4, at least one energy absorbing inflation unit 44 in FIGS. 16 & 17 and the central computer processing unit (CPU) 18.

Figure 16:
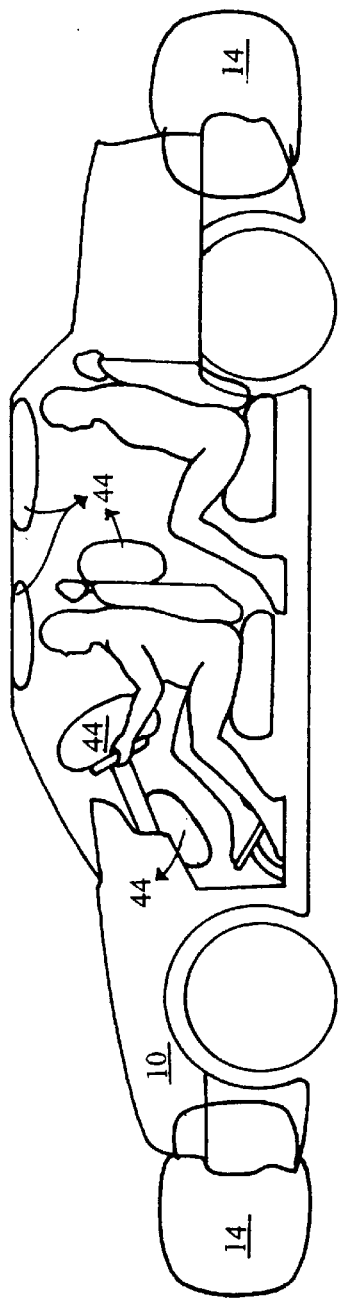
FIGS. 16 and 17 are a diagrammatic views showing the location of internal and external air bags of the roadway vehicle with the air bags inflated.
Figure 17:
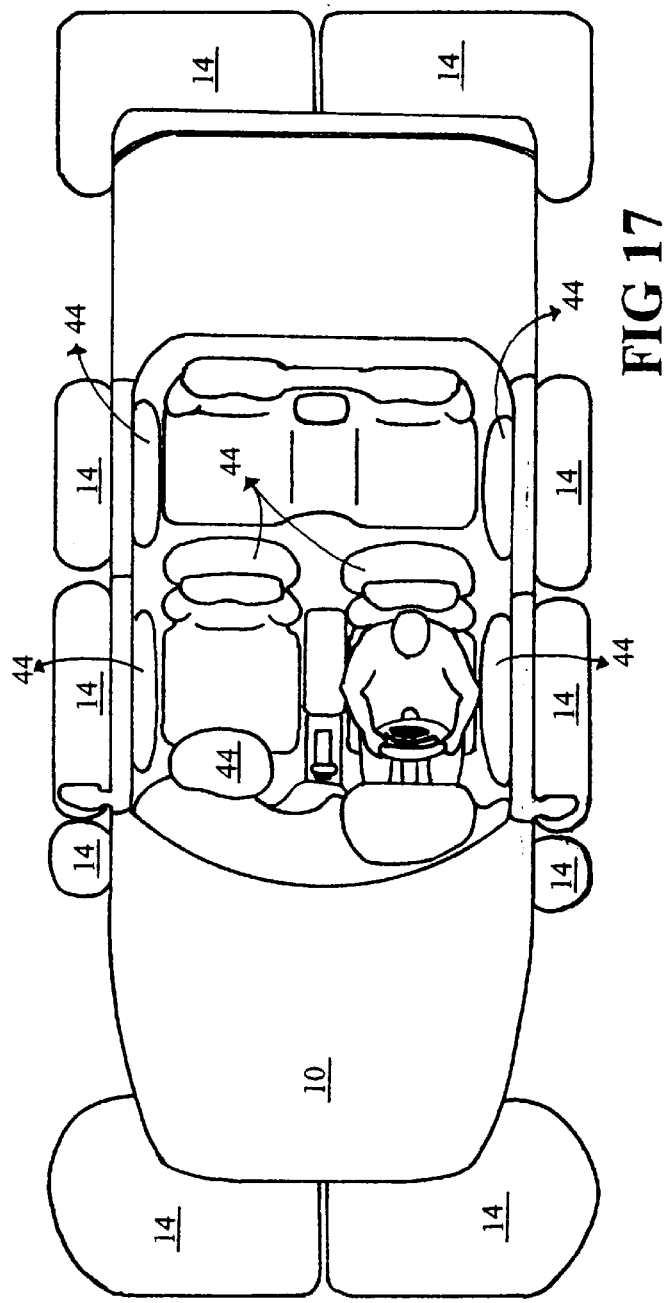

FIGS. 16 and 17 show the locations of the internal air bags 44, including side air bag, knee air bag, rear seat air bag, ceiling air bag, driver and passenger airbags. Inflation of these air bags, just prior to collision, provides cushions for the occupants to restrict the travel and force of the impact with the obstacle. On the contrary, the air bag in prior arts is deployed upon impact by which the occupants are being thrown causing a second collision often resulting in abrasions, broken members and in death.

Figure 18:
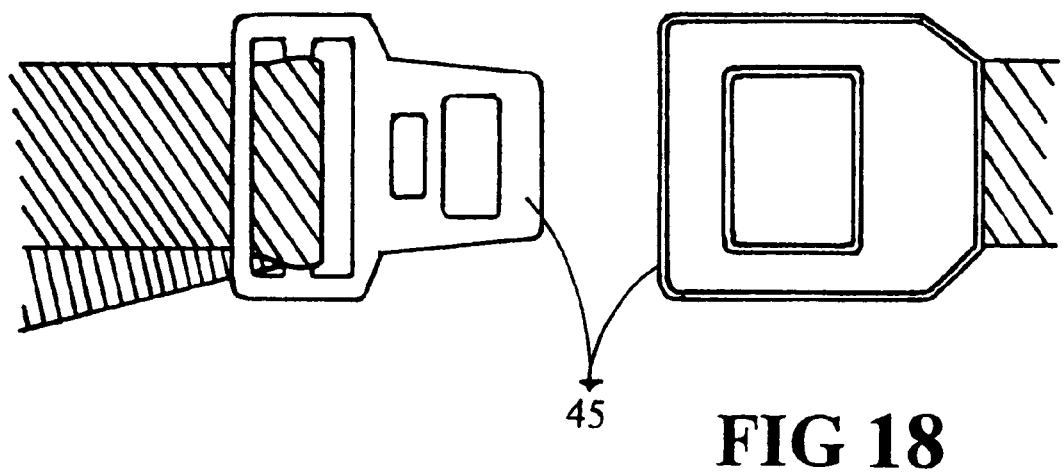
FIG. 18 is a diagrammatic view of a seat belt buckle and clasp.

FIG. 18 shows a seat belt buckle set which is to be clasped in order to prevent the unnecessary deployment of the internal air bags prior to a collision. To hold the internal air bag form being deployed when a seat is not occupied, the two methods are proposed for being applied: (1) the buckle 45 is directly connected with the ignition switch of the inflation unit 16 shown in FIGS. 5 and 6, wherein the buckle is not connected with the CPU, (2) the buckle 45 is connected with the CPU only, wherein if the buckle 45 is not clasped, the circuit in the control line 26 shown in FIGS. 3 and 4 between the CPU and the inflation unit 16 shown in FIG. 5 is broken as the CPU doesn't make an air bag inflation order. This would prevent the costly operation associated with the unnecessary deployment of the air bag. However, the inflation unit is standard in the industry and has a volume of inflation gas to be released into the associated air bag to protect the passenger. In the present invention the system will deploy the air bag in the minimum allowable time window upon the CPU determining an imminent collision and sending signals to the inflation unit. Thus, the passengers are still in the normal riding position when the air bags deploy prior to a real collision, and immediately an impact occurs carrying the passenger in the direction of the impact and against an already inflated air bag.

Figure 19:
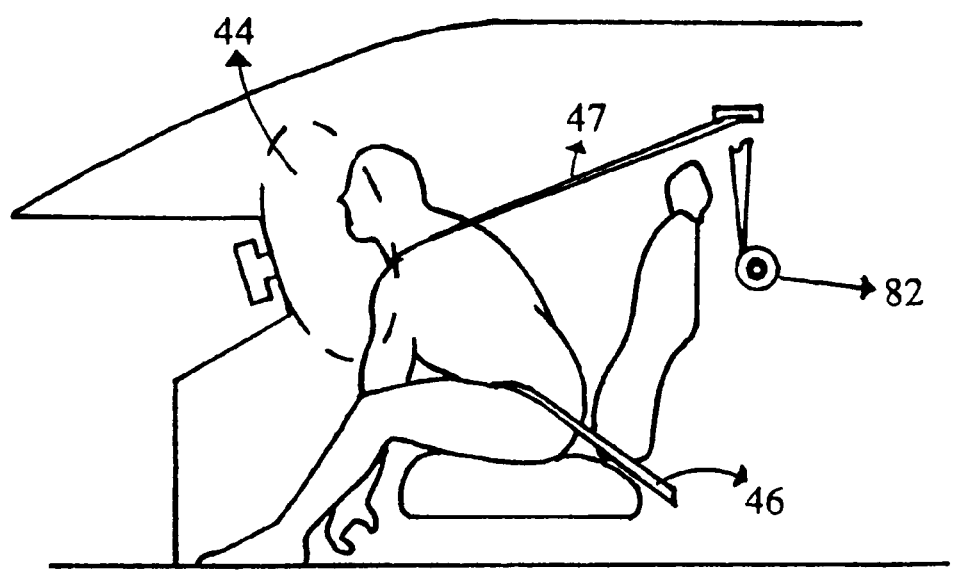
FIG. 19 is a diagrammatic view of a passenger leaning forward of the normal position in a seat to illustrate the shoulder belt and air bag control.

FIG. 19 illustrates a driver or a passenger of a roadway vehicle bending forward in the seat to get something from the floor of the vehicle or from the glove compartment, wherein if the air bag were to inflate by the system of the conventional devices sensing an imminent collision at that moment, the person will have to encounter a blow of 200 mph from the inflating air bag. To avoid such situation, the present invention includes a system to control the inflation unit 16 shown in FIG. 5 by a switch installed on the roller 82. A large person will normally require more length of the seat belt and the shoulder strap. When the belt is stretched out more than a normal allowable amount, the switch of the roller 82 is opened to disconnect the roller from the CPU to disable the air bags 44 and an audio and/or visual alarm is activated. When the roller 82 starts to role by pulling it out, the switch puts the air bag function to the normal position. When the passenger returns to the normal position from the bent position, the alarm stops and the roller switch and the CPU for the air bag system return to normal.

Figure 20:
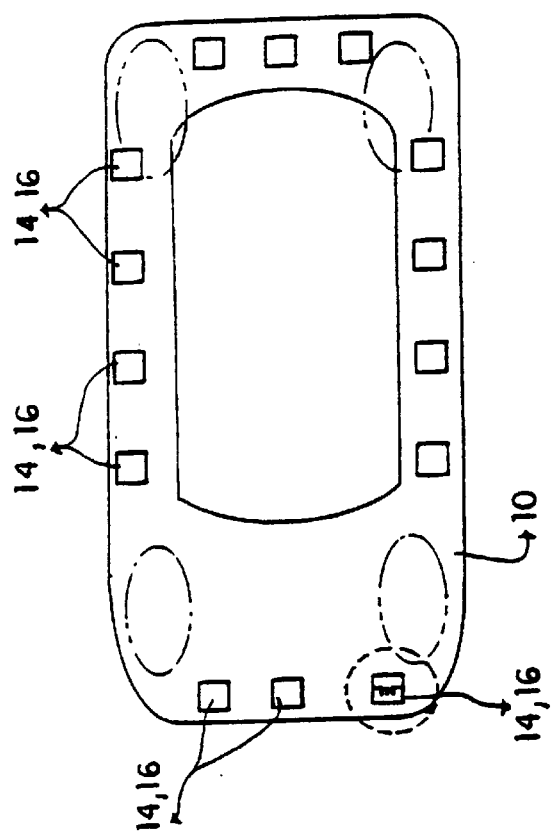
FIG. 20 is a top environmental view of the preferred embodiment of the arrangement of the air bag and detector locations external to the vehicle.

FIG. 20 illustrates the preferred position and arrangement for the inflation units 16 and external air bags 14 which protect the vehicle and the occupants from damage and injury. The roadway vehicle 10 has a plurality of the inflation units 16 and associated air bags 14 positioned around the vehicle. The CPU 18 is also operable to selectively control each inflation device and minimizes damage to the vehicle regardless of the direction of the imminent collision.

Figure 21:
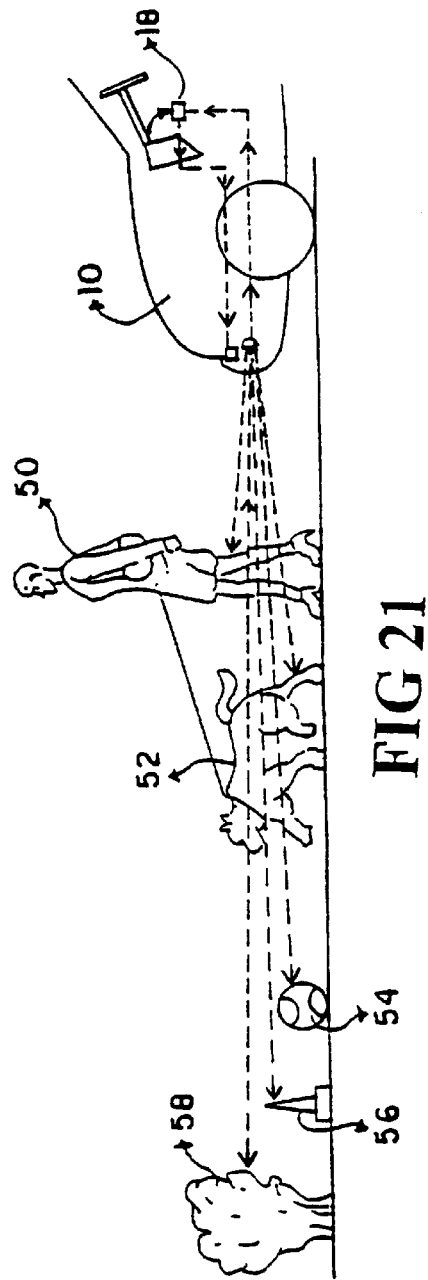
FIG. 21 is an environmental view illustrating the system predicting collision with other obstacles.
Figure 22:
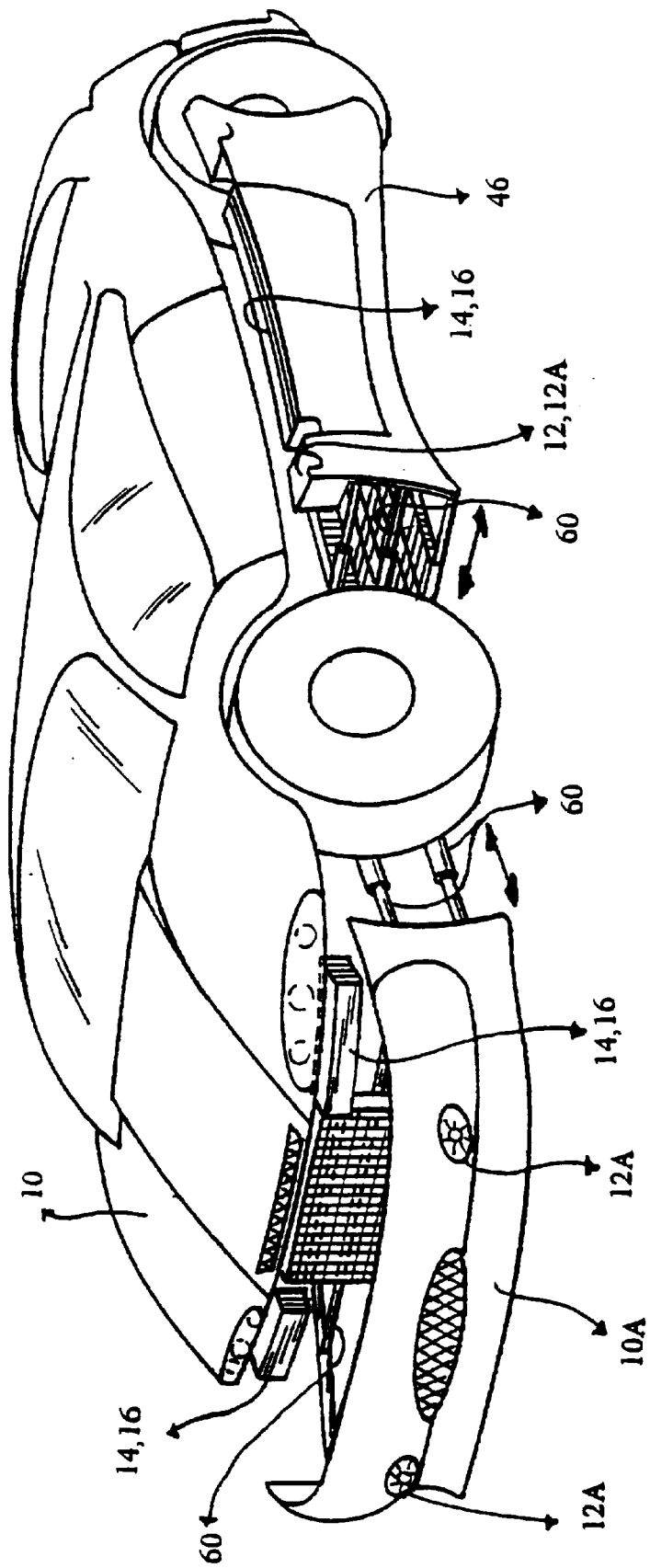
FIG. 22 is a perspective view showing a modular automobile body for returning the deflated and folded air bag to the automobile as shown in FIG. 3 after a collision.

FIG. 22 shows an exemplary view of the interior system of the vehicle 10. The vehicle 10 of FIG. 22 has a modular characteristic, in that the bumpers 10A and door panels 46 are supported on rails 60. These rails 60 allow the bumpers 10A and door panels 46 to slide out and away from the vehicle 10, like drawers. Once in the open position, the deflated and refolded air bags are replaced internally of the vehicle and the bumpers 10A and door panels are returned to the vehicle. Since the amount of damage would be minimal, even at higher velocities, the aesthetic quality of vehicle 10 is preserved. It should be noted that one aspect of the invention is to reduce the physical damage of the vehicle although the invention also protects the occupants of the vehicle from extreme injury created by the impact force, due to the impact being greatly reduced by the system of the present invention. After deployment the system would simply require recharge of the compressed gas in inflation unit 16 and upon deflation, refolding and repositioning of the air bags 14 in the vehicle 10. Additionally, the invention serves to minimize damage to other non-moving vehicles or obstacles. For example, as best seen in FIG. 21, the radar unit 12 functions to detect pedestrians 50, animals 52, inanimate objects (such as balls 54, pylons, cones, flags, barricades 56, etc), and plants or trees 58. In addition, the system may detect walls, guardrails and utility poles.

Figure 23:
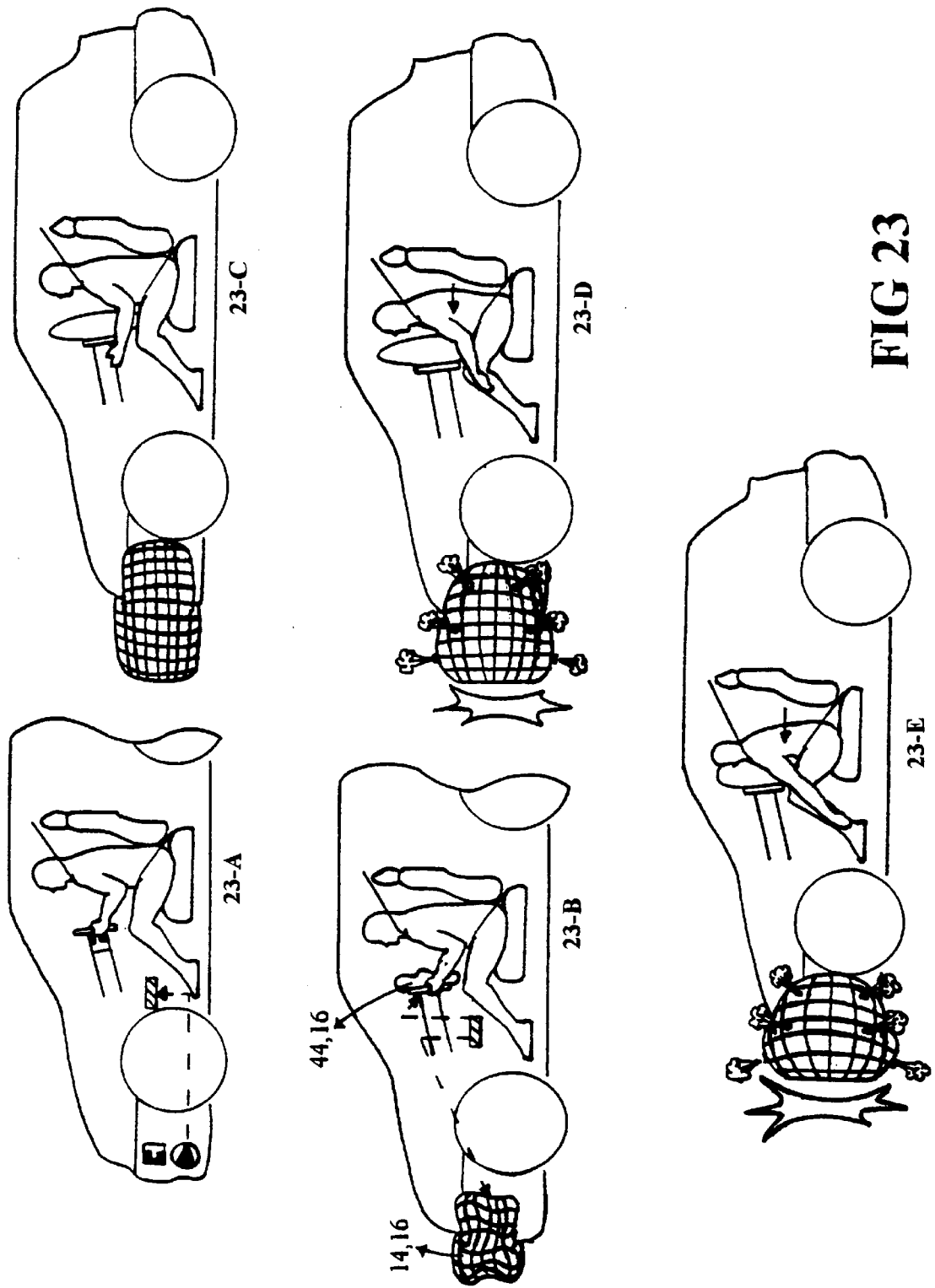
FIG. 23 is a series of views depicting (23-A) the normal position of an occupant in a roadway vehicle, (23-B) the position at the time the CPU determines a collision is imminent and air bag to start to inflate, (23-C) the position just prior to impact, (23–D) the position upon initial impact or collision, and (23–E) the position when the roadway vehicle initially comes to rest after collision.
Figure 24:
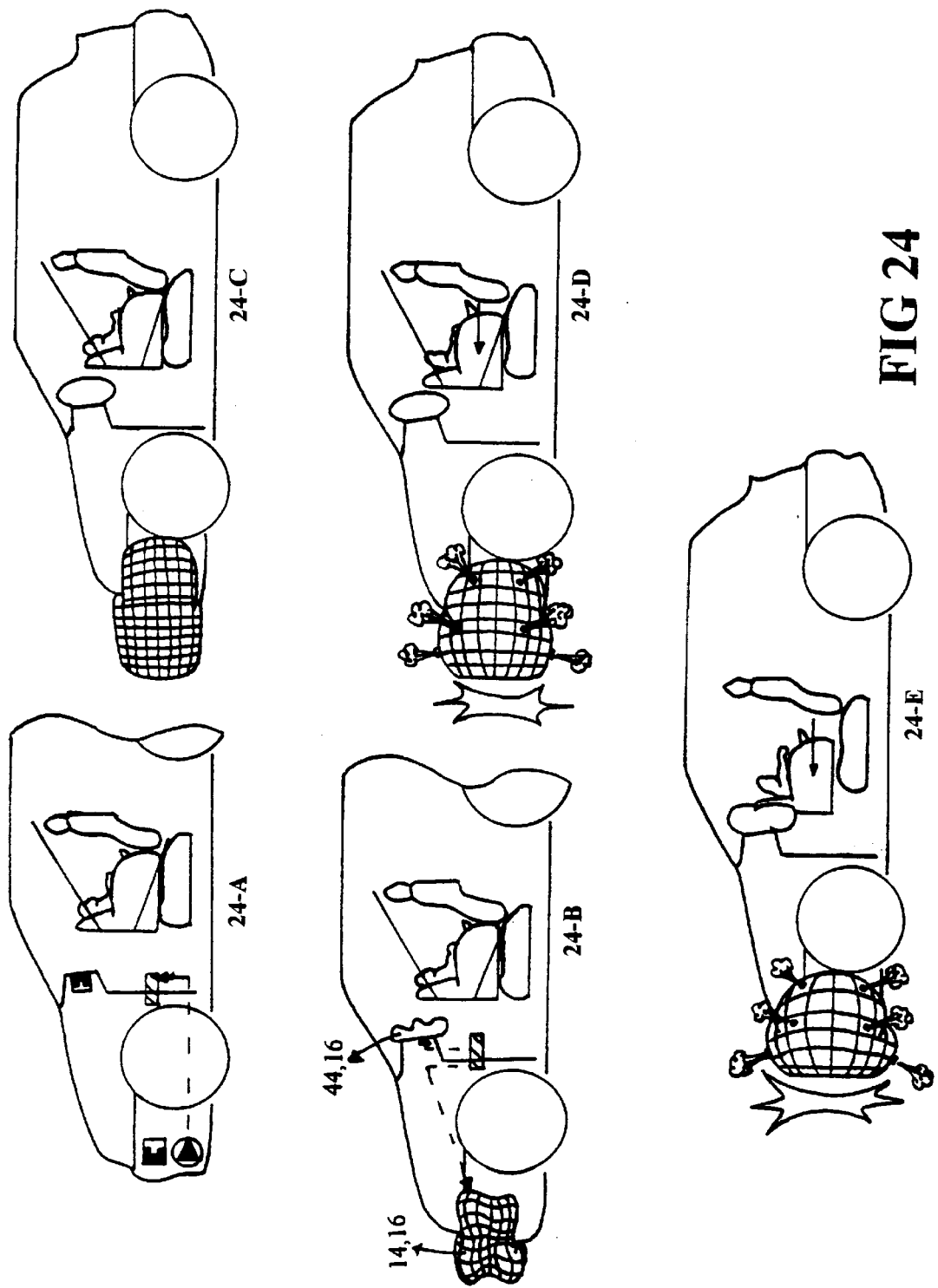
FIG. 24 is a series of views depicting a child seat in the passenger seat of a roadway vehicle in (24-A) the normal position of the roadway vehicle, (24-B) the position at the time the CPU determines a collision is imminent and air bag starts to inflate, (24-C) the position just prior to impact, (24-D) the position upon initial impact or collision, and (24-E) the position when the roadway vehicle initially comes to rest after collision.

FIGS. 23 and 24 disclose various views of the roadway vehicle with the passengers. CPU sends a signal to deploy the air bags and the air bags are deployed. Upon a collision, the movement of the vehicle and passengers associated with the impact is made against the air bags. The internal air bags are selectively inflated according to the location at which the collision occurs. In FIG. 23 several views depict the operation of the present invention.

First, view 23-A in FIG. 23 shows vehicle and occupant in the normal position. In view 23-B, it shows the CPU has signaled that a collision is imminent and the inflation units 16 are triggered and the air bags 14 and 44 are being deployed. The air bags in view 23-C are fully deployed. In view 23-D, collision has occurred and the occupant is thrown against the inflated air bags and the external air bag has made contact with an obstacle abruptly beginning deceleration of the roadway vehicle, and the view 23-E illustrates the roadway vehicle to have stopped. FIG. 24 depicts in several views the sequence with a child in the next seat to the driver. The child is protected by the seat belts in the seat in view 24-A. In view 24-B, CPU has signaled that a collision is imminent and the inflation unit 16 is triggered and the air bags 14 and 44 are being deployed. In view 24-C, the air bags are fully deployed and the collision occurs instantaneously. In view 24-D, the collision has occurred, and the child seat and infant are moved toward the inflated air bags against the strain of the seat belts as indicated by the arrow. The external air bag has made contact with the obstacle abruptly beginning deceleration of the roadway vehicle. In view 24-E, the roadway vehicle has stopped and the child seat hits against the cushion of the air bag.

Figure 26:
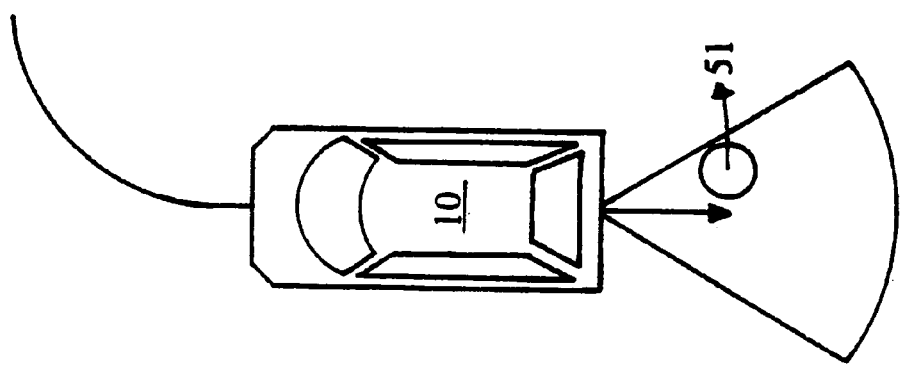
FIG. 26 illustrates diagrammatically the vehicle warning feature of the present system to alert the driver of the roadway vehicle (10) foot something existing behind the vehicle.
Figure 25:
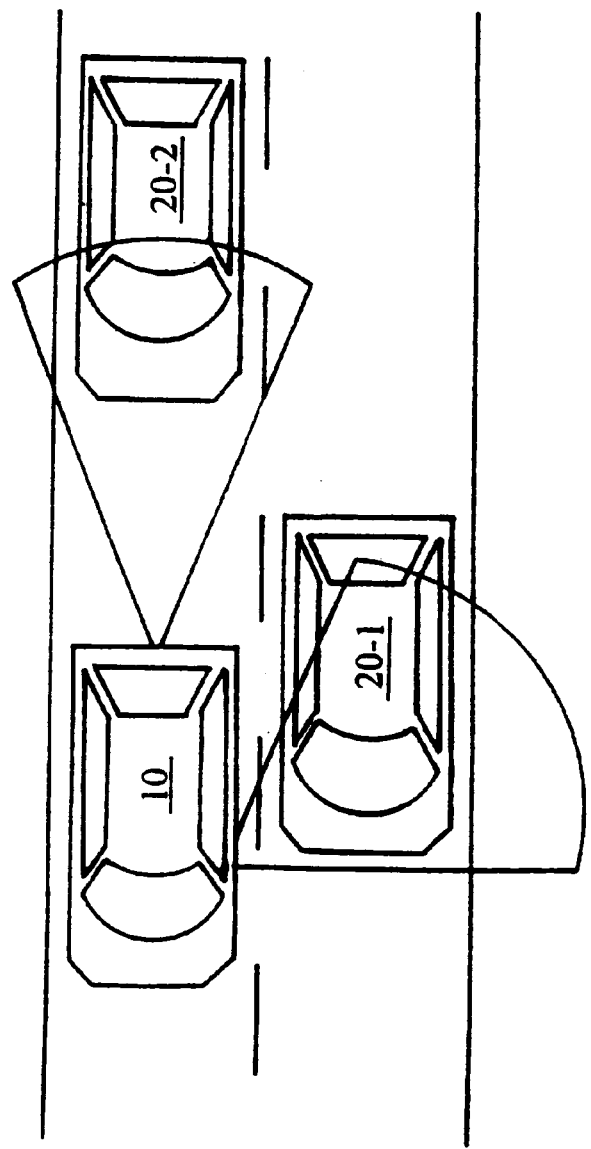
FIG. 25 illustrates diagrammatically the vehicle warning feature of the present system to alert the driver of the roadway vehicle (10) when obstacle (20-1) is in dead angle.

FIG. 25 illustrates vehicles equipped with the system of the present invention moving along a multi-lane roadway. So often a driver has blind spots and cannot see vehicles that are adjacent to the roadway vehicle 10 and the system of the present invention can be equipped with a warning system to alert the driver to the presence of adjacent vehicles 20-1 and 20-2. Such warning can be visual, light or other signal, audio such as a sound from a buzzer, or a digital readout giving speed and location of the adjacent vehicle. Such information is also given when the roadway vehicle 10 backs up as indicated in FIG. 26. A small object 50 in the rear of the vehicle 10 shown in FIG. 26 will be picked up by the system and a warning signal will be given to the driver of the roadway vehicle 10.

FIG. 27 illustrates diagrammatically the squeeze-in system which can be used for the situation that the driver of vehicle 10 desires to make a lane change to the adjacent lane. When vehicle 10 is going to change its lane to the left, the CPU mounted on vehicle 10 calculates on the basis of the information received from the radar and informs the driver of the current status. If speed of vehicle 10 is 20 mph more than that of vehicle 20, the sign given by the CPU to the driver of vehicle 10 will indicate as −20 mph. On the contrary, if speed of vehicle 20 is 20 mph more than that of vehicle 10, it will indicate as +120 mph as seen in FIG. 27A on the appropriate place such as mirrors (1), corners of the front window (2), surface of the dashboard (3) and etc. Therefore, the (+) sign indicates that the speed of vehicle 10 relative to vehicle 20 is sufficient to allow vehicle 10 to change lanes. Using the system of squeeze-in will help the driver make an easy decision as to whether to change lanes or not.

Figure 28:
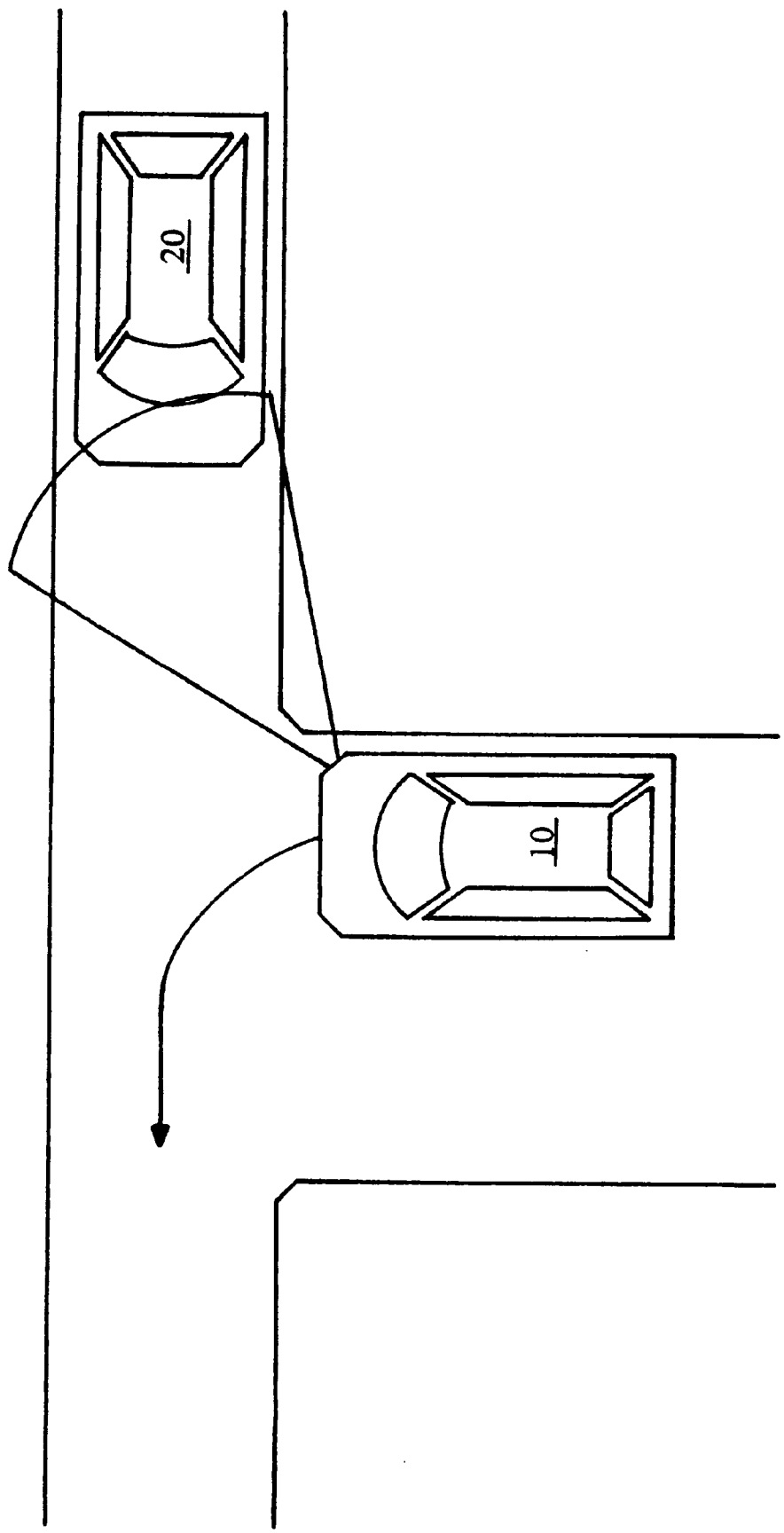

FIG. 28 illustrates another aspect of the present invention using the squeeze-in system. The system informs the driver of vehicle 10 of the speed of vehicle 20 approaching the intersection. It is not appropriate to move into the intersection when radar unit detects the approaching vehicle 20 on the right, and then CPU provides the driver of the vehicle 10 with the speed of vehicle 20 to help for his decision on turning into the intersection.

Figure 29:
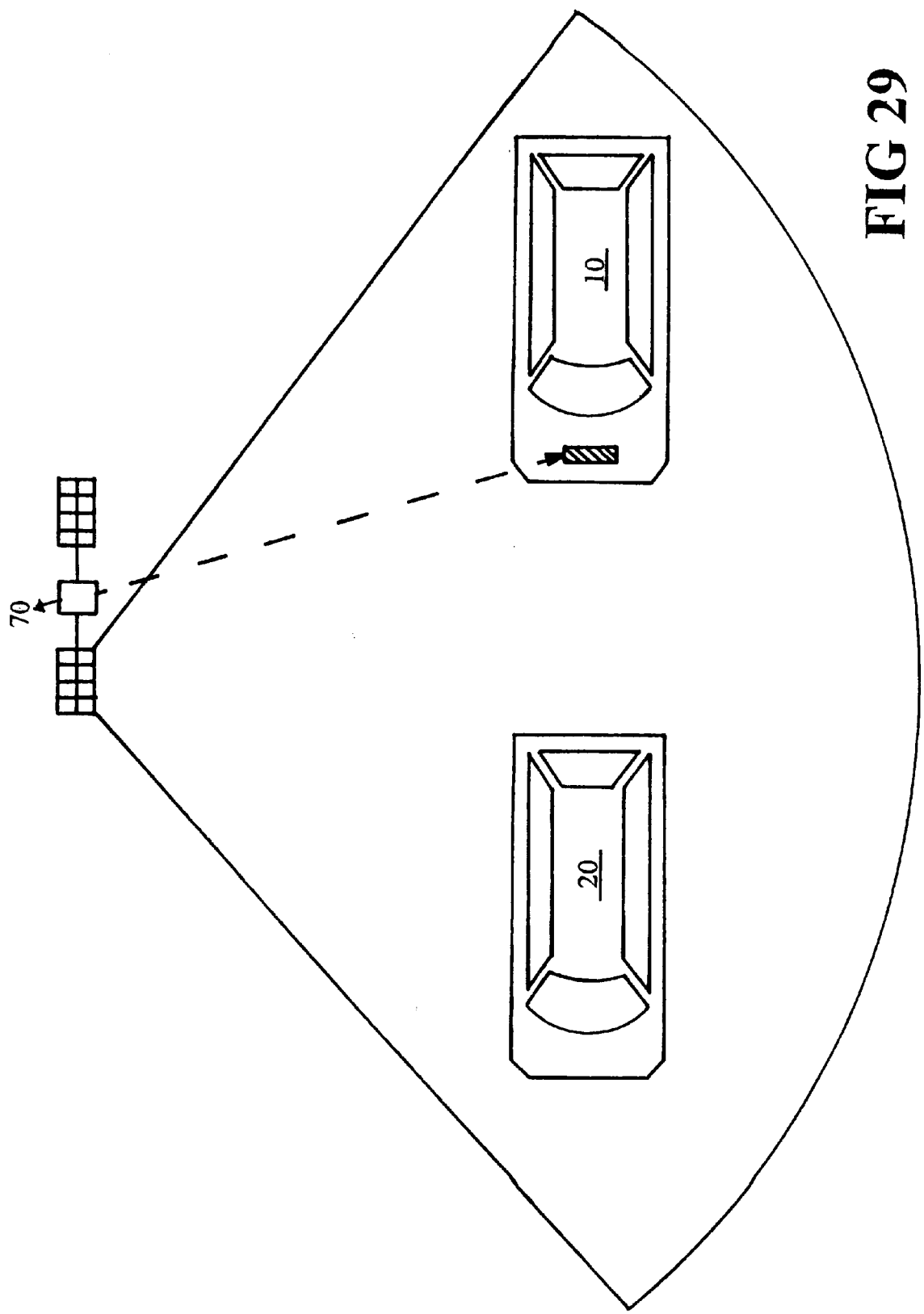
FIG. 29 is a diagrammatic view of the satellite (70) in place of the radar to monitor the location of the roadway vehicle (10) and other vehicle (20)

FIG. 29 diagrammatically illustrates the system according to the present invention, wherein satellite 70 affords signals of the location of vehicle 10 and the location of obstacle 20 to the CPU mounted on vehicle 10. The signal from the satellite is more accurate concerning the location of obstacles.

Figure 30:
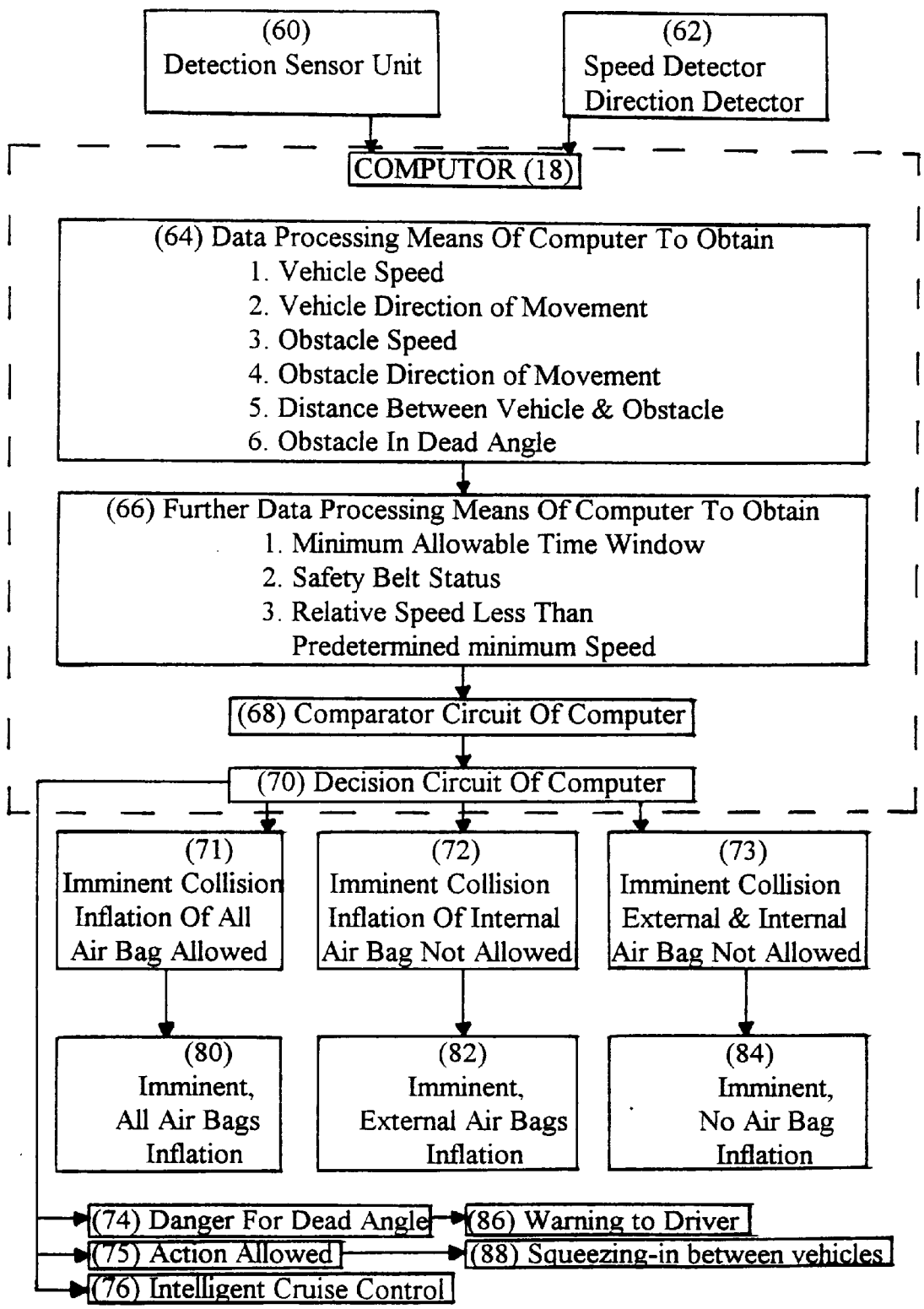
FIG. 30 is a block diagram illustration of the typical flow of the system logic for predicting a collision and deploying the air bags.

FIG. 30 shows a block diagram which provides a complete overview of the functional operation of the system disclosed herein. Block 60 for detection sensor unit, represents the radar 12. Block 62 for speed detector and direction detector disclosing information concerning the roadway vehicle 10 transmitted to CPU. The CPU 18 is shown incorporating the various processing sequences. Block 64 receives the information from block 60 and 62, and processes the information into usable data for the CPU 18. Block 66 gathers additional information to be used in determining whether to inflate the internal air bags, for prediction of collision point, for establishment of collision unavoidable distance on the basis of the minimum allowable time window, for determination of safety belt status whether fastened or not, and for determination of the relative speed between the two vehicles to be less than the predetermined minimum speed prestored in the CPU. Block 68 represents the means to continuously compare information provided by Block 64 and Block 66. The output of block 68 is sent to block 70. Block 70 of the CPU 18 examines the output of block 68 and the result of which comes to one of the six sections; 71 is imminent situation—all air bags to inflate in Block 80, 72 is imminent situation—only external air bag to inflate against the predicted collision in Block 82, 73 is imminent situation but not much damage—no air bags to inflate in Block 84 in which case the collision would result in inexpensive damage or injury in comparison with the cost of repair or replacement of an air bag. 74 is for dangerous situation for an obstacle being found in dead angle and warning is given to driver in Block 86, 75 is for vehicle's action to be allowed when trying to change the lane to the adjacent one and the roadway vehicle squeezes into the adjacent lane in Block 88, 76 is for initiating the intelligent cruise control to be made by the CPU 18. When Block 70 comes to an imminent situation, the CPU 18 selects one of the 6 situations and renders a proper action to be taken.

Figure 31:
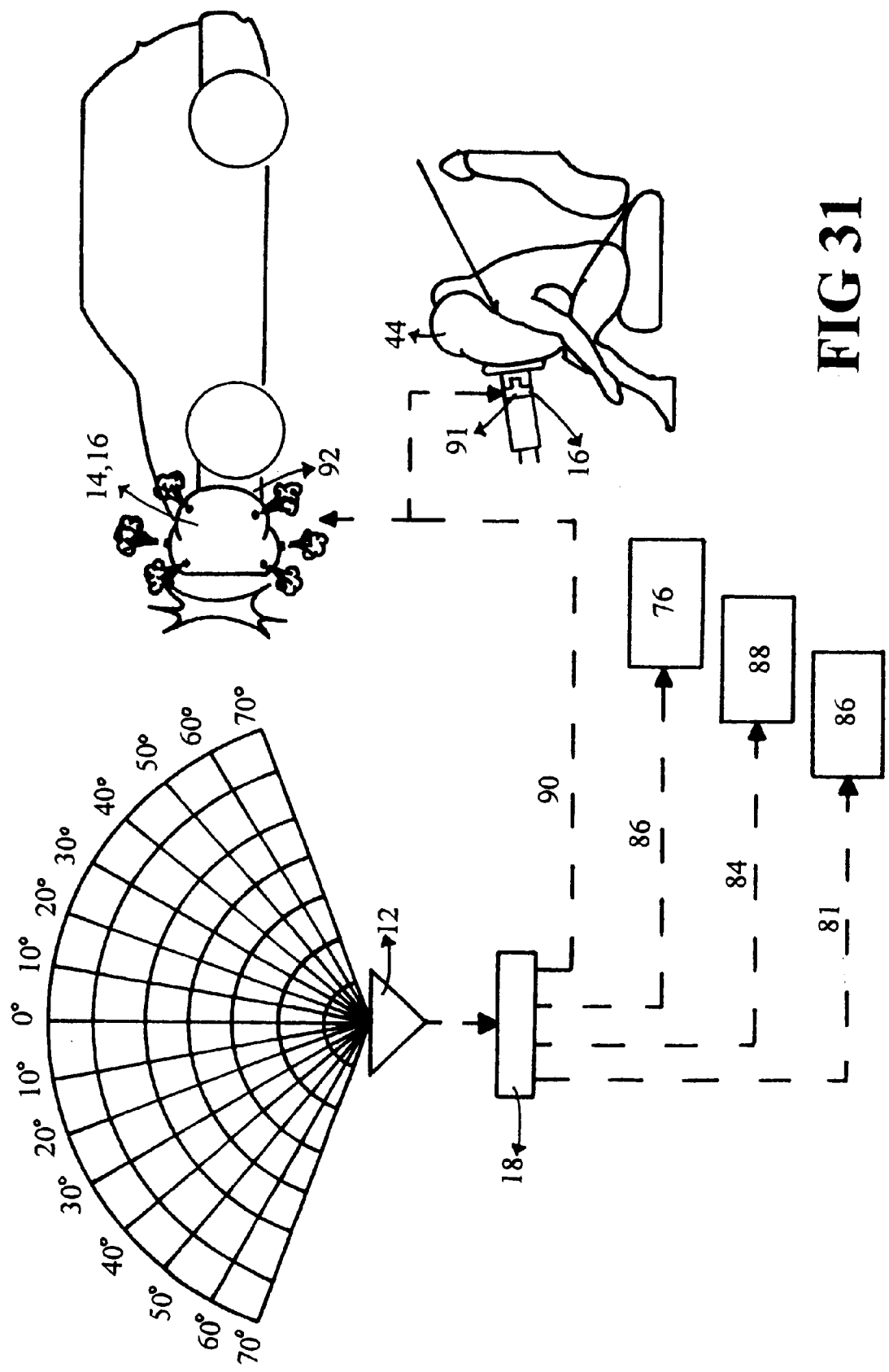
FIG. 31 is a diagrammatic view of the system of the present invention and its relationship to the systems described in blocks and schematic representation.

FIG. 31 diagrammatically illustrates how the present system operates in conjunction with other safety systems. Each radar 12 scans the area to the right, left and front of the unit over an included angle of the radar 12 and transmits to the CPU 18 speed, direction and distance data of any obstacle in the ranges of distance in meters from the unit. The information is continually fed to the CPU 18 and the CPU 18 then generates control signals 81 to the danger warning system 86 to alert the driver of the roadway vehicle of the presence of other vehicles or objects in blind spots (dead angle) on either side and behind the vehicle and provides a warning signal on the probable danger. The CPU 18 generates control signals 84 to the squeeze-in system 88 to provide the driver with information concerning the velocity of other vehicles in adjacent lanes or intersecting lanes to assist the driver in determining when to safely squeeze in the lane or merge with the traffic. The CPU 18 generates control signals 86 to the intelligent cruise control system 76 to change the speed of the roadway vehicle, accelerate or brake the vehicle according to the speed of the obstacle. The CPU 18 generates control signals 90 to the air bag inflation system 91 to actuate the inflation device 16 for internal air bags 44 and to the air bag inflation system 92 to actuate the inflation device 16 for external air bags 14. The air bag inflation system 91 also serves to control the air bag 44 to be inflated or not, in response to the rotation of the retraction roller of the seat belt, and for the work of the air bag 14 the system 92 actuates in the minimum allowable time window at the speed more than the predetermined minimal speed settled by a vehicle experiment (e.g. 5 mph).

FIG. 32 has two different views. View 32-1 illustrates that radar 12 of conventional device mounted on the roadway vehicle 10 anticipates an imminent situation but as the radar 12 is capable of detecting only speed and distance and unable to detect the moving direction of other vehicle 20, there is no way for the radar 12 to distinguish between an actual collision situation and one in which a collision may be avoided by evasive action. View 32-2 shows that the vehicle 10 equipped with radar 12 of the present invention, based on the information of speed, distance and direction of the other vehicle 20 and speed, direction of the vehicle 10, brings forth an accurate result in determination for imminent situation, wherein 10 is roadway vehicle, 12 represents radar of the present invention and 20 is other vehicle. The radar 12 on the roadway vehicle 10 in View 32-2 detects speed, distance of 120 cm (from roadway vehicle 10 to point 24 of other vehicle 20) and direction of other vehicle 20 by extending the past track by connecting points like 23 (145 cm×4 degree on right) and 24(20 cm×10 degree on right) to predetermine a parabola to be developed (direction can be made by using L1 and L2), and such information is given to the CPU which already has information regarding speed and direction of the roadway vehicle 10 and the CPU calculates out whether collision arises or not by establishing a collision unavoidable distance according to the predetermined minimum allowable time window (e.g. 0.2 second) on the line of the parabola. If the parabola reaches the radar 12, a collision definitely arises and so the CPU orders the external air bag to inflate, but the inflation of the internal air bag requires such conditions as (1) relative speed to be more than the predetermined minimal speed prestored in the CPU, (2) safety belt to be fastened but length of the belt to be within the predetermined limit. The minimum allowable time window (M) of the present invention as seen in FIG. 32A covers a time period during which a driver is unable to take action of turning steering wheel or braking to evade a collision. The minimum allowable time window (M) includes (1) time period covering from the time of returning point of the signal of said detection sensor unit on an obstacle which is the beginning time of the minimum allowable time window, up to the time when the air bag receives inflation order from said CPU, (2) time period covering from the time of said CPU orders inflation of to the air bag up to the time of the air bag is completely inflated, (3) time period covering from the time the air bag is completely inflated up to the time of a collision. No matter what type of sensor and method are used, the minimum allowable time window of the present invention is the most important one for having the air bag to inflate prior to a collision.

Figure 33:
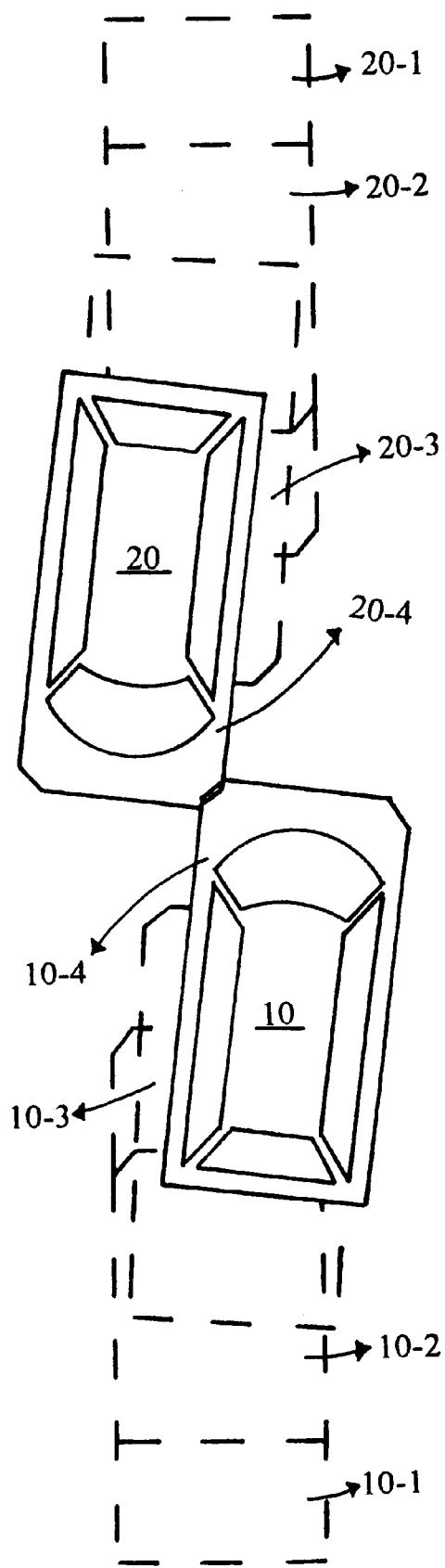
FIG. 33 illustrates the preceding aspects of the two vehicles (10 and 20) in imminent situation, wherein collision is commonly made on the corner of the vehicle.

FIG. 33 illustrates two vehicles' movement in an imminent situation. Vehicles 10-1 and 20-1 show that both vehicles are approaching each other on a collision course. In such situation, prior to collision, drivers generally turn the steering wheel to a side to evade a collision as seen in the views 10-3, 10-4 and 20-3, 20-4 of FIG. 33. Because of the possibility of unconsciously turning the steering wheel, no one is able to accurately determine whether a collision will actually occur or not. But within the minimum allowable time window prior to collision, it is impossible for a driver to move his foot from the accelerating pedal to the brake pedal or to make a sudden turning of the steering wheel because of the extremely short period of time during which drivers are apt to lose control themselves. Therefore the distance taking the predetermined minimum allowable time (e.g. 0.2 second) to an anticipated collision point is presumed as a collision unavoidable distance. In order for the CPU to make an accurate determination for the situation whether a collision will take place or not, the following information are to be provided.

1) The information regarding the roadway vehicle 10's speed given by the speed detector and direction obtained by the direction detector of the roadway vehicle 10, 2) The information regarding other vehicle's speed, moving direction and distance from the roadway vehicle obtained through radar 12 as in 32-2 of FIG. 32.

3) With the information of 1) and 2) above, the CPU determines the collision point by calculating out a collision unavoidable distance on the basis of the predetermined minimum allowable time window with information of moving direction (parabola) of the other vehicle 20 made in the past time up to the starting point of the minimum allowable time window, as seen in View 32-2 of FIG. 32. By extending the parabola of the other vehicle 20, if the parabola reaches the roadway vehicle 10, collision will be definitely made but if the parabola doesn't reach the roadway vehicle 10 collision will not occur. As another aspect of the present invention, the CPU 18 calculates a collision point by extending the two parabolas of the roadway vehicle and the other vehicle. If the extended parabolas meet at a point, that point is a predicted collision point and a collision definitely arises when the point stays within the range of minimum allowable time window.

It is to be understood that the present invention is not limited to the embodiments described above, but encompasses any and all embodiments within the scope of the following claims.

I claim:

1. A collision damage minimizing system for a roadway vehicle comprising:

at least one detection sensor unit mounted on the roadway vehicle for detecting speed, distance and direction of a potential obstacle, said at least one detection sensor unit including transmitter means for transmitting signals and highly directional receiver means for receiving signals reflected by a potential obstacle and generating an electronic signal in response thereto;

means for detecting speed of roadway vehicle;

means for detecting direction of roadway vehicle;

a computer processing unit (CPU) for receiving information on the speed and direction of the roadway vehicle and for receiving signals from said detection sensor unit, said CPU continuously processing the information and signals and calculating changes in the speed, distance and direction of the potential obstacle with respect to the roadway vehicle, said CPU generating a control signal upon calculation of an imminent collision situation based on a predetermined minimum allowable time window, said minimum allowable time window defining a time period during which a driver of the roadway vehicle is unable to take evasive action to avoid the calculated imminent collision situation; and at least two energy absorbing inflation devices, at least one of said energy absorbing inflation devices being responsive to said control signal, each of said energy absorbing inflation devices including means for producing inflation gas and an electronically controlled valve for releasing said inflation gas;

at least one external air bag coupled to said valve of one of said energy absorbing inflation devices and at least one internal air bag coupled to said valve of the another of said energy absorbing inflation devices for inflation upon receiving said inflation gas, said external air bag being deflated, folded and positioned internally of the roadway vehicle upon inflation; whereby upon calculation by the CPU of the imminent collision situation based on the predetermined minimum allowable time window, the CPU transmits the control signal to at least one of the energy absorbing inflation devices to deploy either the external air bag or the internal air bag, or both the external and internal air bag prior to time of the calculated imminent collision situation.

2. A collision damage minimizing system according to claim 1, wherein said minimum allowable time window includes (1) period beginning with time said signals returns form the potential obstacle and prior to time detection sensor unit receives said signals reflected by the potential obstacle up to the time said control signal is received by at least one of said energy absorbing inflation devices, (2) period said control signal is received by at least one of said energy absorbing inflation devices up to time said external or internal air bag is completely inflated, and (3) period said external or internal air bag is completely inflated up to time of collision.

3. A collision damage minimizing system according to claim 1, wherein said detection sensor unit is selected from the group consisting of a radiant energy detector and a sonic detector.

* * * * *

UNITED STATES PATENT AND TRADEMARK OFFICE
CERTIFICATE OF CORRECTION

PATENT NO. : 5,959,552
DATED : Sept. 28, 1999
INVENTOR(S) : Myungeun Cho

It is certified that error appears in the above-identified patent and that said Letters Patent is hereby corrected as shown below:

In the claim 1, column 15, line 11:

The following is omitted and needs to be inserted between "vehicle" and "upon".

prior to inflation, and said external air bag being positioned externally of the roadway vehicle In the claim 2, column 16, line 4:

Word "form" is misspelled and needs to be corrected as "from"

Signed and Sealed this

Twentieth Day of June, 2000

Attest:

Q. TODD DICKINSON

Attesting Officer

Director of Patents and Trademarks